(12) United States Patent
Stabon et al.

(10) Patent No.: US 9,777,423 B2
(45) Date of Patent: Oct. 3, 2017

(54) METHOD FOR TREATING LAUNDRY IN A LAUNDRY WASHING MACHINE AND LAUNDRY WASHING MACHINE

(71) Applicant: Electrolux Appliances Aktiebolag, Stockholm (SE)

(72) Inventors: Elisa Stabon, Gorizia (IT); Andrea Zattin, Solesino (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 37 days.

(21) Appl. No.: 14/911,905

(22) PCT Filed: Aug. 12, 2013

(86) PCT No.: PCT/EP2013/066785
§ 371 (c)(1),
(2) Date: Feb. 12, 2016

(87) PCT Pub. No.: WO2015/022002
PCT Pub. Date: Feb. 19, 2015

(65) Prior Publication Data
US 2016/0194807 A1    Jul. 7, 2016

(51) Int. Cl.
*D06F 39/02*    (2006.01)
*D06F 35/00*    (2006.01)
(Continued)

(52) U.S. Cl.
CPC .............. *D06F 39/02* (2013.01); *D06F 29/02* (2013.01); *D06F 35/005* (2013.01);
(Continued)

(58) Field of Classification Search
CPC .... D06F 35/005; D06F 35/006; D06F 39/006; D06F 39/02; D06F 39/083; D06F 39/088; D06F 2226/00; D06F 2232/06
See application file for complete search history.

(56) References Cited

U.S. PATENT DOCUMENTS

| | | | |
|---|---|---|---|
| 5,199,127 A | | 4/1993 | Van Newenhizen et al. |
| 5,233,718 A | * | 8/1993 | Hardaway ............. D06F 35/006 68/23.5 |

(Continued)

FOREIGN PATENT DOCUMENTS

EP    0726349 A2    8/1996

OTHER PUBLICATIONS

International Search Report mailed Mar. 19, 2014 in corresponding International Application No. PCT/EP2013/066785.

*Primary Examiner* — Joseph L Perrin
(74) *Attorney, Agent, or Firm* — Banner & Witcoff, Ltd.

(57) ABSTRACT

A method for treating laundry in a laundry washing machine (1; 201; 301; 401) having: a washing tub (3) external to a rotatable perforated washing drum (4) configured to receive laundry; a water supply circuit (5) to supply water into the washing tub (3); a detergent supplier (60) to supply detergent (D) into the washing tub (3); a rinse additive supplier (70) to supply at least one rinse additive (S) into the washing tub (3); a first recirculation circuit (30) suitable for withdrawing liquid from the bottom region (3*a*) of the washing tub (3) and for re-admitting such a liquid into the bottom region (3*a*) of the washing tub (3). The method has a washing phase (120) during which the laundry is washed with introduction of water and detergent (D) into the washing tub (3) and tumbled by rotation of the washing drum (4), at least one successive draining phase (125) for draining liquid from the washing tub (3) and at least one following rinsing cycle (130*a*, 130*b*, 130*n*; 130′*n*; 230*a*, 230*b*, . . . , 230*n*) during which the laundry is treated with the rinse additive (S). The rinsing cycle (130*n*; 130′*n*; 230*n*) has the steps of: introducing (140; 140'; 240) a quantity (Qs) of rinse additive (S) into the washing tub (3); introducing (140; 140'; 240) a first quantity (Q1w) of water (W) into the washing tub (3); activating (141; 141'; 241) the first recirculation circuit (Continued)

(30) for withdrawing liquid from the washing tub (3) and re-admitting the liquid into the washing tub (3) in such a way that the rinse additive (S) is diluted with the first quantity (Q1w) of water (W) at the bottom region (3a) of the washing tub (3); introducing (142; 142') the diluted rinse additive into the perforated washing drum (4) in order to be absorbed by said laundry.

28 Claims, 14 Drawing Sheets

(51) Int. Cl.
| | | |
|---|---|---|
| F04B 1/12 | (2006.01) | |
| F04B 1/20 | (2006.01) | |
| F04B 1/32 | (2006.01) | |
| F04B 53/22 | (2006.01) | |
| F03C 1/06 | (2006.01) | |
| D06F 29/02 | (2006.01) | |
| D06F 39/08 | (2006.01) | |
| F16C 17/02 | (2006.01) | |

(52) U.S. Cl.
CPC .......... D06F 39/083 (2013.01); D06F 39/088 (2013.01); F03C 1/0668 (2013.01); F03C 1/0671 (2013.01); F04B 1/124 (2013.01); F04B 1/2078 (2013.01); F04B 1/2085 (2013.01); F04B 1/324 (2013.01); F04B 53/22 (2013.01); D06F 2226/00 (2013.01); D06F 2232/06 (2013.01); F16C 17/02 (2013.01); F16C 2360/00 (2013.01)

(56) References Cited

U.S. PATENT DOCUMENTS

| | | | | |
|---|---|---|---|---|
| 5,249,441 A | * | 10/1993 | Pastryk | ................. D06F 35/006 210/147 |
| 5,271,251 A | * | 12/1993 | Kovich | ................... D06F 23/04 68/171 |
| 2014/0123403 A1 | * | 5/2014 | Zattin | ..................... D06F 25/00 8/137 |

* cited by examiner

METHOD FOR TREATING LAUNDRY IN A LAUNDRY WASHING MACHINE AND LAUNDRY WASHING MACHINE

FIELD

The present invention concerns the field of laundry treating techniques.

In particular, aspects of the present invention refer to a method for treating laundry in a laundry washing machine capable of performing a more efficient fabric softener dilution/dissolution.

BACKGROUND

Nowadays the use of laundry washing machines, both "simple" laundry washing machines (i.e. laundry washing machines which can only wash and rinse laundry) and laundry washing-drying machines (i.e. laundry washing machines which can also dry laundry), is widespread.

In the present description the term "laundry washing machine" will refer to both simple laundry washing machines and laundry washing-drying machines.

Laundry washing machines generally comprise an external casing provided with a washing tub which contains a rotatable perforated drum where the laundry is placed. A loading/unloading door ensures access to the drum.

Laundry washing machines typically comprise a water supply unit and a products supply unit, preferably a drawer, for the introduction of water and washing/rinsing products (i.e. detergent, softener, rinse conditioner, etc.) into the tub.

Known laundry washing machines are also provided with water draining devices that may operate both during different phases of the washing program to drain the dirty water.

According to the known technique, a complete treating program typically includes different phases during which the laundry to be washed is subjected to adequate treatments.

A treating cycle usually comprises a main washing phase during which the laundry is treated by means of water and a detergent. The water is typically heated to a predetermined temperature based on the washing program selected by the user. During the main washing phase the drum is rotated, so as to apply also a mechanical cleaning action on the laundry. At the end of the main washing phase the drum is typically rotated at high rotational speed, so in such a way that dirty washing liquid (i.e. water mixed with detergent) is extracted from the laundry, and this dirty washing liquid is drained to the outside by the water draining devices.

A successive step of the cycle typically comprises a rinsing phase which usually comprises one or more rinsing cycles.

In a rinsing cycle, clean rinse water may be first added to the laundry. The rinse water is absorbed by the laundry and the rinse water removes from the laundry detergent and/or dirty particles not previously removed by washing liquid in the main washing cycle. The drum is then rotated to extract water and dirty particles/detergent from the laundry: the dirty water extracted is drained from the tub to the outside by the water draining devices.

After a rinsing phase, one or more final spinning phases may be provided for the extraction of the residual water contained in the wet laundry.

The water extracted during the spinning phase is drained towards the outside by means of the water draining devices (during or after the spinning phase).

According to the known technique, in the rinse phase a dose of rinse additive is added to the laundry. Rinse additives may comprise, for example, fabric softeners, fabric conditioners, waterproofing agents, fabric enhancers, rinse sanitization additives, chlorine-based additives, i.e. products suitable to be added in one of the rinsing cycles.

The rinse additive is typically added in the last rinsing cycle, in particular when the rinse additive is a fabric softener. In different embodiments, nevertheless, the rinse additive may not be added in the last rinsing cycle but before. For example, the rinse additive is typically added in the first rinsing cycle when the rinse additive is a chlorine-based additive.

Use of rinse additives contributes to reach special features for the laundry, such as softness, long lasting perfume, waterproofing, sanitization, etc.

Rinse additives may be used in particular form, typically and preferably in liquid form, but also as a gel, or powder, or tabs, or liquid-tabs.

Typically, rinse additives are delivered from the products supply unit (drawer) into the tub. The rinse additive falls at the bottom region of the tub and from there enters the perforated rotatable washing drum.

However, the washing programs of the known art pose some drawbacks.

A drawback posed by the washing programs of the known art lies in that the rinse additive enters the drum and wets the fabrics directly, thus creating high concentration areas of the same rinse additive over the laundry items.

High concentration of rinse additive in particular areas on the laundry items may cause a not homogenous treatment of the same laundry items.

The washed laundry, therefore, may not have the requested homogenous special features, i.e. softness, perfume, waterproofing, sanitization, etc.

High concentration of rinse additives may then cause stains or halos on the laundry items. Again, the washed laundry may not have the requested homogenous special features, i.e. softness, perfume, waterproofing, sanitization, etc.

Said drawbacks are nowadays particularly emphasized due to the use of concentrated or super concentrated rinse additives, such as concentrated or super concentrated softeners.

An object of aspects of the present invention is therefore to overcome the drawbacks posed by the known technique.

It is an object of aspects of the invention to provide a method for washing laundry in a laundry washing machine that makes it possible to improve the distribution of the rinse additives over the laundry items with respect to the known technique.

It is another object of aspects of the invention to provide a method for washing laundry in a laundry washing machine that makes it possible to improve the efficiency of the rinse additives on the laundry.

It is a further object of aspects of the invention to provide a method for washing laundry in a laundry washing machine that makes it possible to improve the homogeneity of the distribution of rinse additives on the laundry.

SUMMARY OF SELECTED INVENTIVE ASPECTS

The applicant has found that by providing a method for treating laundry in a laundry washing machine of the type comprising a washing tub external to a rotatable perforated washing drum adapted to receive laundry and comprising a recirculation circuit suitable for withdrawing liquid from the bottom region of said washing tub and for re-admitting such a liquid into said bottom region of said washing tub, wherein the method comprises at least one rinsing cycle using a rinse additive and wherein the method comprises a step of activating the recirculation circuit in such a way that said rinse additive is diluted with dilution water at said bottom region of said washing tub, it is possible to obtain an improved dilution of the rinse additive for the laundry compared to the machines of known type.

Aspects of the present invention relate, therefore, to a method for treating laundry in a laundry washing machine of the type comprising:
- a rotatable perforated washing drum provided with holes and adapted to receive laundry;
- a washing tub external to said washing drum;
- a water supply circuit comprising at least one supply valve to supply water into said washing tub;
- a detergent supplier to supply detergent into said washing tub;
- a rinse additive supplier to supply at least one rinse additive into said washing tub;
- a first recirculation circuit suitable for withdrawing liquid from a bottom region of said washing tub and for re-admitting such a liquid into said washing tub such that at least a portion of the re-admitted liquid reaches said bottom region of said washing tub without entering said washing drum;

the method comprising at least one washing phase during which said laundry is washed with introduction of water and said detergent into said washing tub and tumbled by rotation of said washing drum, at least one successive draining phase for draining liquid from said washing tub and following said draining phase at least one rinsing cycle during which said laundry is treated by means of said at least one rinse additive;

wherein said rinsing cycle comprises the steps of:
- introducing a quantity of said rinse additive into said washing tub;
- introducing a first quantity of water into said washing tub by activating said supply valve;
- activating said first recirculation circuit for withdrawing liquid from said washing tub and re-admitting said liquid into said washing tub in such a way that a diluted rinse additive is obtained by mixing said quantity of said rinse additive with said first quantity of water at said bottom region of said washing tub;
- introducing said diluted rinse additive into said washing drum in order to be absorbed by said laundry.

In a preferred embodiment of the invention, the step of activating the first recirculation circuit starts at the same time of the activation of the supply valve.

In another preferred embodiment of the invention, the step of activating the first recirculation circuit starts during the step of introducing a first quantity of water into the washing tub and after a delay time from the activation of the supply valve.

In a further preferred embodiment of the invention, the step of activating the first recirculation circuit starts after the step of introducing a first quantity of water into the washing tub.

In a further preferred embodiment of the invention, the step of activating the first recirculation circuit starts before the step of introducing a first quantity of water into the washing tub.

Opportunely, the step of activating the first recirculation circuit lasts for a predetermined period of time suitable for homogeneously mixing the quantity of the rinse additive with said first quantity of water.

Preferably, the step of activating the first recirculation circuit is carried out continuously.

Alternatively, the step of activating the first recirculation circuit is carried out intermittently.

In a preferred embodiment of the invention, the step of introducing the diluted rinse additive into the washing drum is carried out by means of a second recirculation circuit suitable for withdrawing liquid from the bottom region of the washing tub and for re-admitting such a liquid into an upper region of the washing tub.

Preferably, the step of introducing the diluted rinse additive into the washing drum is carried out by conveying the diluted rinse additive from the bottom region of the washing tub directly through the holes of the washing drum when the diluted rinse additive is at a level inside the washing tub in which the diluted rinse additive touches the washing drum and/or when the washing drum is set rotated.

In a further preferred embodiment of the invention, the step of introducing the diluted rinse additive into the washing drum is carried out exclusively by conveying the diluted rinse additive from the bottom region of the washing tub directly through the holes of the washing drum when the diluted rinse additive is at a level inside the washing tub in which the diluted rinse additive touches the washing drum and/or when the washing drum is set rotated.

Opportunely, said level is a level which is above the lower point of the washing drum.

Preferably, during and/or after the step of introducing the diluted rinse additive into the washing drum the washing drum is set rotated.

In a preferred embodiment of the invention, the step of introducing the diluted rinse additive into the washing drum is performed after a step of de-activating the first recirculation circuit.

In a further preferred embodiment of the invention, the step of introducing the diluted rinse additive into the washing drum is started before a step of de-activating the first recirculation circuit.

In a preferred embodiment of the invention, the step of introducing a quantity of the rinse additive into the washing tub is carried out such that at least a portion of the rinse additive reaches the bottom region of the washing tub without entering the washing drum.

Preferably, the step of introducing a quantity of the rinse additive into the washing tub is carried out such that substantially all the quantity of the rinse additive reaches the bottom region of the washing tub without entering the washing drum.

According to a preferred embodiment of the invention, after the step of introducing the diluted rinse additive into the washing drum the method further comprises a step of introducing a second quantity of water into the washing tub.

Opportunely, the method comprises a further step of introducing liquid from the bottom region of the washing tub into the washing drum in order to be absorbed by the laundry.

In a preferred embodiment of the invention, the further step of introducing liquid into the washing drum is carried out by means of a second recirculation circuit suitable for withdrawing liquid from the bottom region of the washing tub and for re-admitting such a liquid into an upper region of the washing tub.

Preferably, the further step of introducing liquid into the washing drum is carried out by conveying the liquid from the bottom region of the washing tub directly through the holes of the washing drum when the liquid is at a level inside the washing tub in which the liquid touches the washing drum and/or when the washing drum is set rotated.

In another preferred embodiment of the invention, the further step of introducing liquid into the washing drum is carried out exclusively by conveying the liquid from the bottom region of the washing tub directly through the holes of the washing drum when the liquid is at a level inside the washing tub in which the liquid touches the washing drum and/or when the washing drum is set rotated.

Opportunely, said level is a level which is above the lower point of the washing drum.

Preferably, during and/or after the further step of introducing liquid into the washing drum the washing drum is set rotated.

In a preferred embodiment of the invention, the rinsing cycle further comprises a water removal step for removing water from the laundry to the outside.

According to a preferred embodiment of the invention, the method further comprises one or more final spinning phases for extracting residual water contained in the laundry.

In a preferred embodiment of the invention, the first recirculation circuit is suitable for withdrawing liquid from a sump at the bottom region of the washing tub and for re-admitting such a liquid into the sump.

Preferably, the at least one rinse additive is a rinse additive of the group comprising: a fabric softener, a fabric conditioner, a waterproofing agent, a fabric enhancer, a rinse sanitization additive, a chlorine-based additive.

More preferably, the fabric conditioner is a fabric softener.

In a further aspect thereof, the present invention concerns a laundry washing machine suited to implement the method of the invention described above.

BRIEF DESCRIPTION OF THE DRAWINGS

Further characteristics and advantages of the present invention will be highlighted in greater detail in the following detailed description of preferred embodiments of the invention, provided with reference to the enclosed drawings. In said drawings.

DETAILED DESCRIPTION OF EXAMPLE EMBODIMENTS

Figure 1:
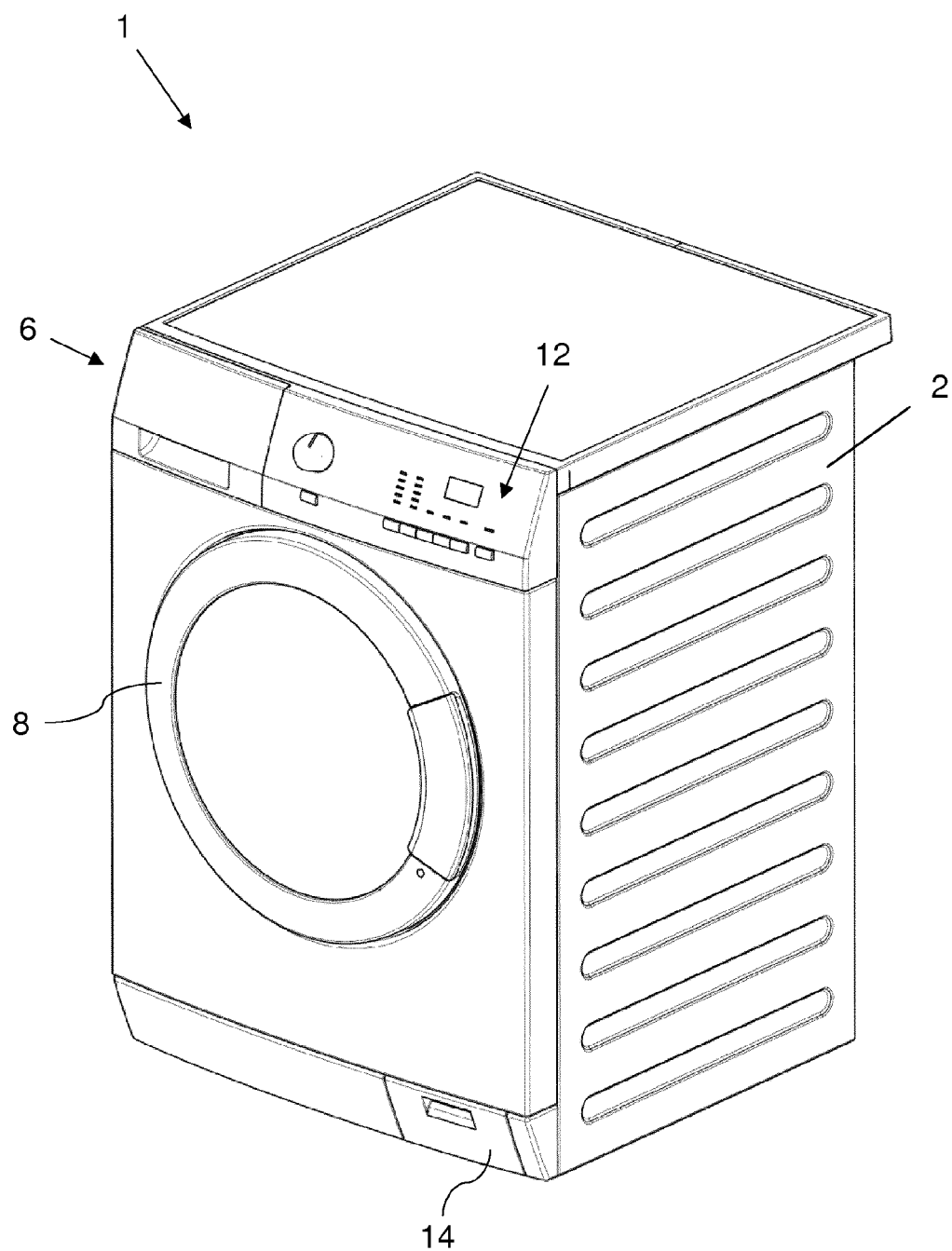
FIG. 1 shows a perspective view of a laundry washing machine implementing the method according to a first embodiment of the invention.

Aspects of the present invention have proved to be particularly advantageous when applied to laundry washing machines, as described below. It should in any case be underlined that aspects of the present invention are not limited to laundry washing machines. On the contrary, aspects of the present invention can be conveniently applied to laundry washing-drying machines (i.e. laundry washing machines which can also dry laundry).

In the present description, therefore, the term "laundry washing machine" will refer to both simple laundry washing machines and laundry washing-drying machines.

With reference to Figures from 1 to 6 a laundry washing machine 1 is illustrated, in which a method according to a first embodiment of the invention is advantageously implemented.

The laundry washing machine 1 comprises an external casing or housing 2, in which a washing tub 3 is provided that contains a perforated washing drum 4 where the laundry to be treated can be loaded.

The tub 3 and the drum 4 both preferably have a substantially cylindrical shape. Between the tub 3 and the drum 4 a gap 55 is defined.

The housing 2 is provided with a loading/unloading door 8 which allows access to the drum 4.

The tub 3 is preferably suspended in a floating manner inside the housing 2, advantageously by means of a number of coil springs and shock-absorbers 9.

The drum 4 is advantageously rotated by an electric motor, not illustrated, which preferably transmits the rotating motion to the shaft of the drum 4, advantageously by means of a belt/pulley system. In a different embodiment of the invention, the motor can be directly associated with the shaft of the drum 4.

The drum 4 is advantageously provided with holes which allow the liquid flowing therethrough. Said holes are typically and preferably homogeneously distributed on the cylindrical side wall of the drum 4.

The tub 3 is preferably connected to the casing 2 by means of an elastic bellows 7, or gasket.

The tub 3 preferably comprises two complementary hemi-shells 13 and 14 structured for being reciprocally coupled to form the tub 3.

Figure 5:
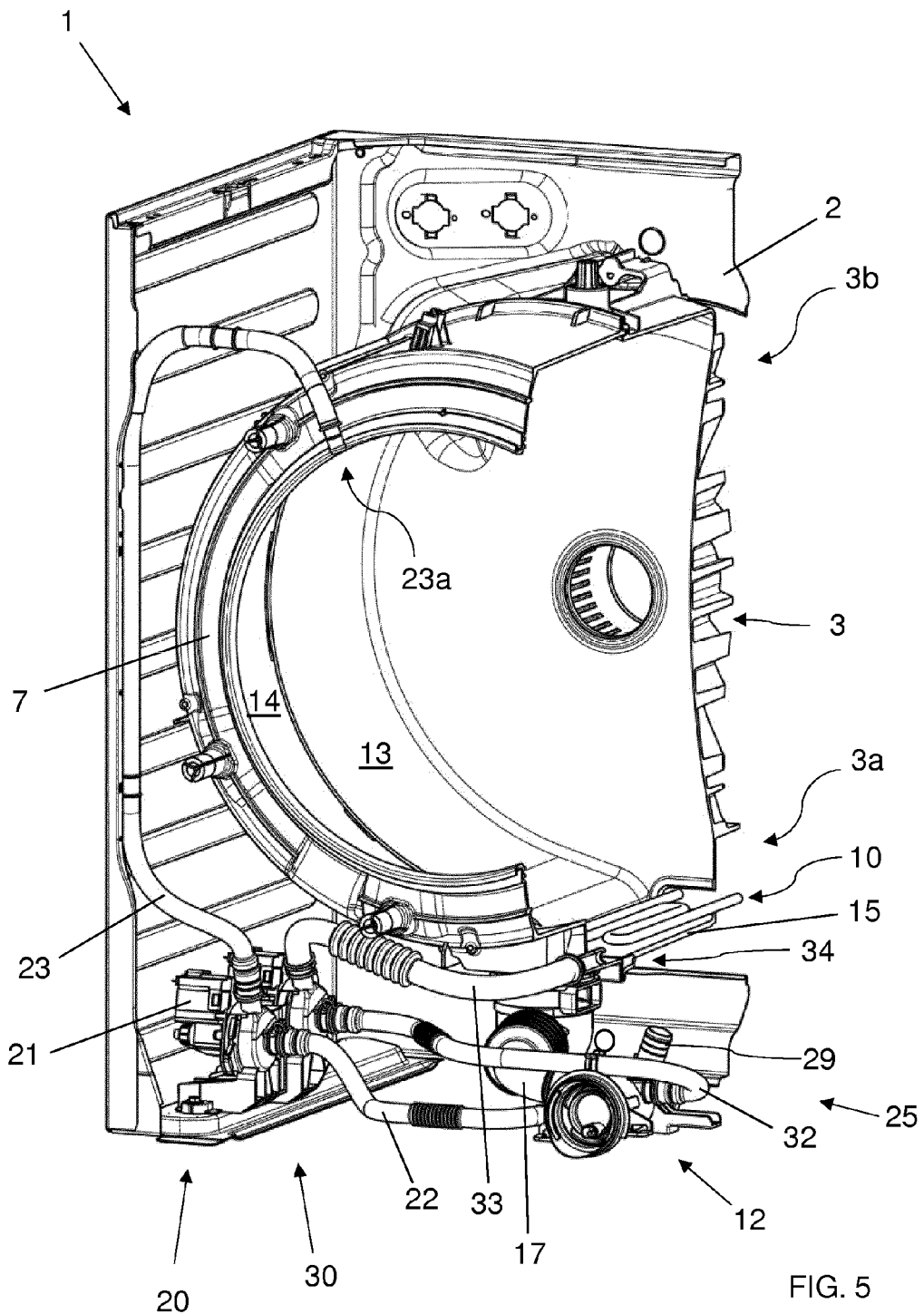
FIG. 5 shows a partial view of the laundry washing machine of FIG. 1 with the external casing partially removed.

The bottom region 3a of the tub 3 preferably comprises a seat 15, or sump, suitable for receiving a heating device 10, as illustrated in FIG. 5. The heating device 10, when activated, heats the liquid inside the sump 15.

The heating device 10 preferably comprises an electrical resistor of serpentine type. The heating device 10 is horizontally placed in the sump 15 and it extends substantially from a front part up to a rear part of the sump 15.

In different embodiments, nevertheless, the bottom region of the tub may be configured differently. For example, the bottom region of the tub may not comprise a seat for the heating device. The heating device may be advantageously placed in the annular gap between the tub and the drum.

In further embodiments the heating device may be different and suitable to heat the liquid in the tub, for example a hot air stream, a steam flow, microwaves source, infra-red rays, etc.

A water supply circuit 5 is arranged in the upper part of the laundry washing machine 1 and is suited to supply water into the tub 3. The water supply circuit of a laundry washing machine is well known in the art, and therefore it will not be described in detail. The water supply circuit 5 advantageously comprises at least one supply valve 5*a* which is properly controlled, opened and closed, during the washing cycle.

The laundry washing machine 1 advantageously comprises a detergent supplier 60 to supply detergent D into the tub 3.

The laundry washing machine 1 advantageously further comprises a rinse additive supplier 70 to supply at least one rinse additive S into the tub 3.

In the preferred embodiment here described and illustrated, the detergent supplier 60 and the rinse additive supplier 70 are part of a removable drawer 6 provided with various compartments suited to be filled with detergent D and rinse additive S. In the preferred embodiment here described, the rinse additive S comprises a softener.

In different embodiments, nevertheless, the removable drawer may comprise further compartments suited to be filled with other type of rinse additives, such as fabric conditioners, waterproofing agents, fabric enhancers, rinse sanitization additives, chlorine-based additives, i.e. products which are suitable to be used in the rinsing phase of the washing program (as will be described in details along this description).

In the preferred embodiment here illustrated, the water is supplied into the tub 3 from the water supply circuit 5 by making it flow through the drawer 6 and then through a supply pipe 18.

The water which reaches the tub 3 can, in this case, selectively contain one of the products contained in the compartments of the drawer 6. Such water can be clean if the product in the drawer 6 has been already removed.

In an alternative embodiment of the invention, a further separate water supply pipe can be provided, which supplies exclusively clean water into the tub 3, thus bypassing the compartments of the drawer 6.

The water supply circuit 5 also preferably comprises a water flow sensor, for example a flow meter, which makes it possible to calculate the quantity of water supplied into the tub 3.

Figure 2:
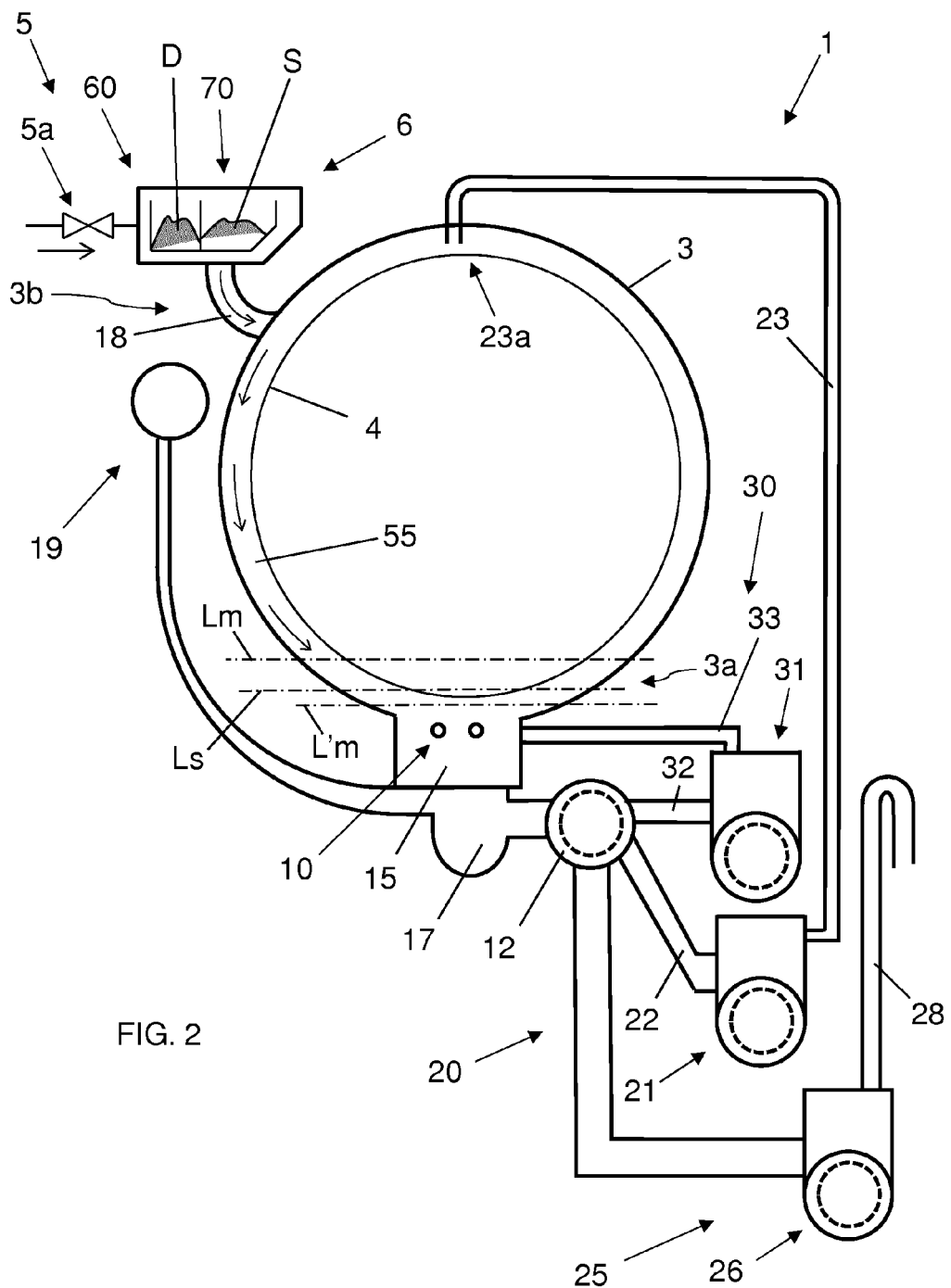
FIG. 2 shows a schematic view of the laundry washing machine of FIG. 1.
Figure 4:
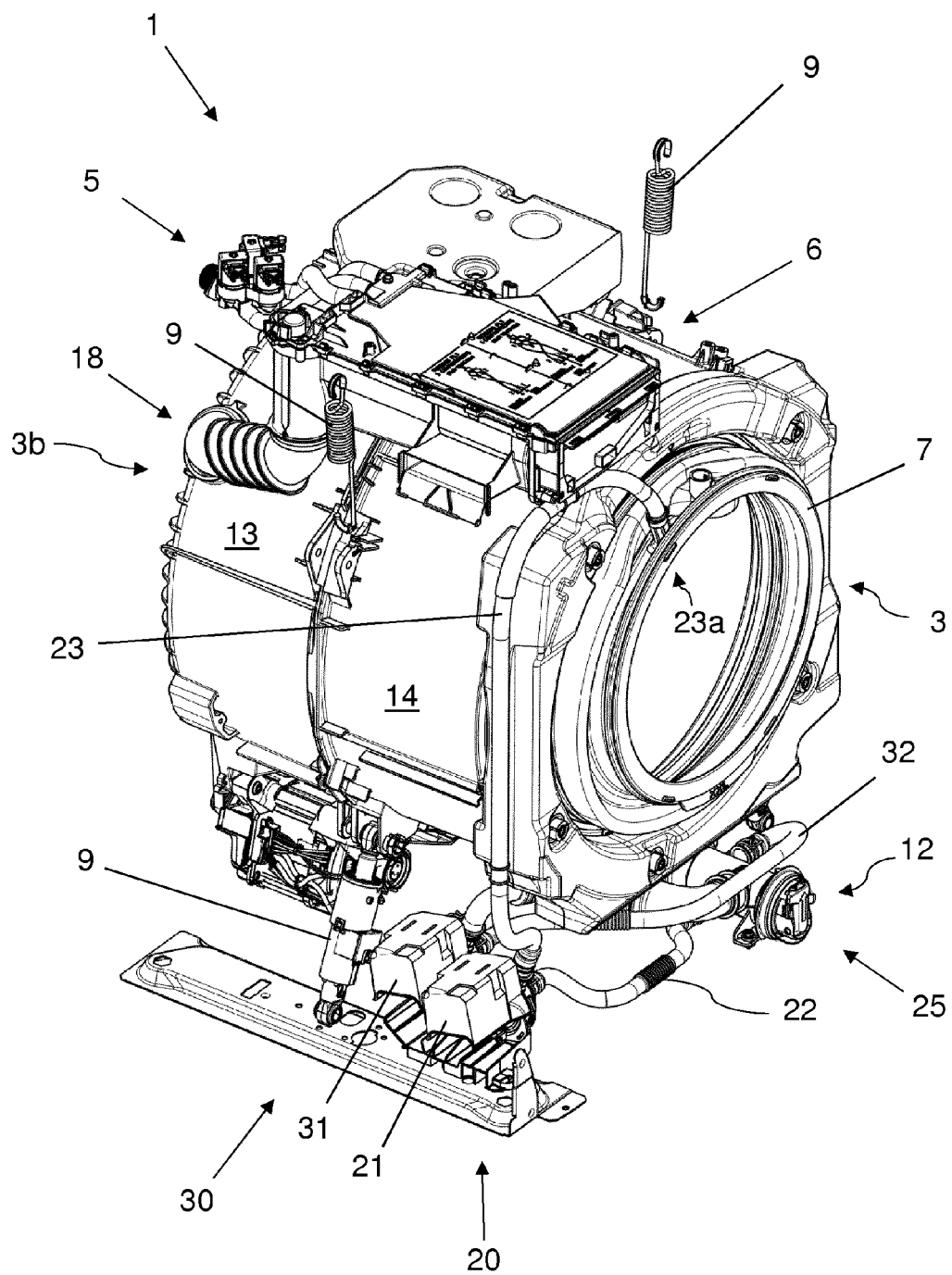
FIG. 4 shows the laundry washing machine of FIG. 3 from another point of view.

The supply pipe 18, as schematically illustrated in FIG. 2 and visible in FIG. 4, is preferably arranged laterally with respect to the tub 3 and preferably terminates at an upper region 3*b* of the tub 3. More preferably, the supply pipe 18 terminates at a rear side of the washing tub 3.

The water supply circuit 5 may then preferably comprise a water softening device for removal of calcium, magnesium and/or certain other metal cations in hard water before entering the tub. The water softening device advantageously comprises water softening agents for reducing the hardness degree of the water to be supplied to the washing tub.

Furthermore, the water supply circuit 5 may comprise a regeneration-agent reservoir which is housed inside the casing and is structured for receiving salt or other regeneration agents for regenerating a water softening function of the water softening agents.

Laundry washing machine 1 advantageously comprises a water outlet circuit 25 suitable for withdrawing liquid from the bottom region 3*a* of the tub 3.

The water outlet circuit 25 preferably comprises a main pipe 17, a draining pump 26 and an outlet pipe 28 ending outside the housing 2.

The water outlet circuit 25 preferably further comprise a filtering device 12 arranged between the main pipe 17 and the draining pump 26. The filtering device 12 is adapted to retain all the undesirable bodies (for example buttons that have come off the laundry, coins erroneously introduced into the laundry washing machine, etc.).

This filtering device 12 can preferably be removed, and then cleaned, through a gate 14 placed advantageously on the front wall of the housing 2 of the laundry washing machine 1, as illustrated in FIG. 1.

The main pipe 17 connects the bottom region 3*a* of the tub 3 to the filtering device 12. An inlet end 17*a* of the main pipe 17 is advantageously positioned at the lower point of the tub 3, more preferably at the lower point of the sump 15.

Figure 6:
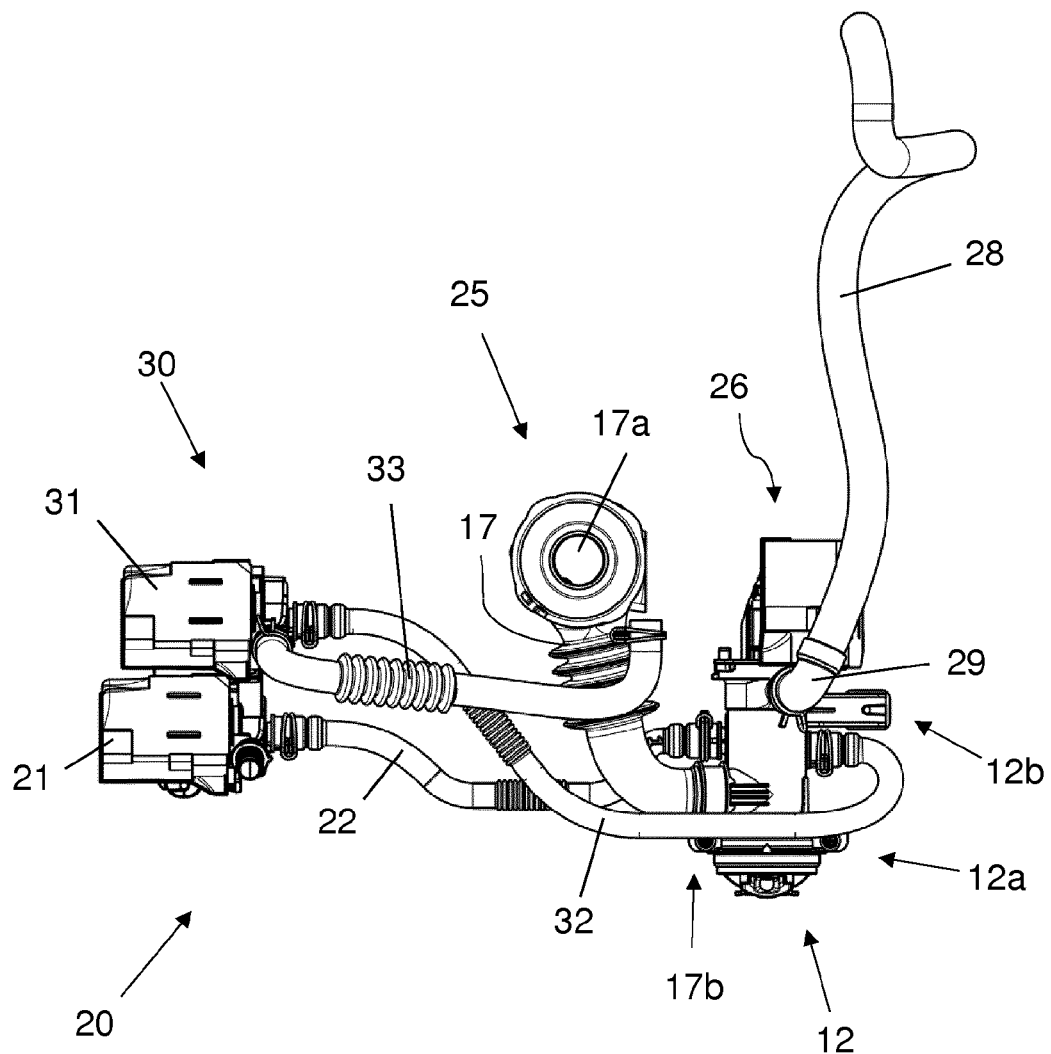
FIG. 6 is a plan view of some components of the laundry washing machine of FIG. 3 isolated from the rest.

An outlet end 17*b* of the main pipe 17 is connected to a front part 12*a* of the filtering device 12, as illustrated in FIG. 6.

In a further embodiment, not illustrated, the filtering device 12 may be provided directly in the tub 3, preferably obtained in a single piece construction with the latter. In this case the filtering device 12 is fluidly connected to the outlet of the tub 3, in such a way that water and washing liquid drained from the tub 3 enters the filtering device 12.

The draining pump 26 is preferably connected to a rear part 12*b* of the filtering device 12 and conveys the liquid to the outlet pipe 28 through an outlet 29, the latest better visible in FIG. 5 where the outlet pipe 28 has been removed.

Activation of the drain pump 26 drains the liquid, i.e. dirty water or water mixed with washing and/or rinsing products, from the tub 3 to the outside.

Laundry washing machine 1 advantageously comprises a first recirculation circuit 30, or mixing circuit 30. The mixing circuit 30 is adapted to drain liquid from the bottom region 3*a* of the tub 3 and to re-admit such a liquid (recirculated mixing liquid) into a first region of the tub 3, which corresponds substantially to the same bottom region 3*a* of the tub 3.

Preferably, the mixing circuit 30 is adapted to drain liquid from the bottom of the sump 15 and to re-admit such a liquid (recirculated mixing liquid) again into the sump 15. More preferably, the liquid is re-admitted again into the sump 15 below the heating device 10.

The mixing circuit 30 preferably comprises a first recirculation pump 31, a first pipe 32 connecting the filtering device 12 to the first recirculation pump 31 and a second recirculation pipe 33 advantageously provided with a terminal portion 34, or nozzle, better visible in FIG. 5. The terminal portion 34 advantageously ends inside the sump 15, as mentioned above.

The liquid from the bottom region 3*a* of the tub 3 is conveyed again towards the bottom region 3*a* of the tub 3 by activation of the first recirculation pump 31. Advantageously, the liquid from the bottom region 3*a* of the tub 3 is conveyed towards the bottom region 3*a* of the tub 3 in the gap 55 between the tub 3 and the drum 4.

In a further embodiment, not illustrated, the mixing circuit may comprise a dedicated pipe connecting the bottom region of the tub to the recirculation pump; in this case the mixing circuit is advantageously completely separated from the water outlet circuit, i.e. completely separated from the filtering device 12 and the main pipe 17.

The mixing circuit (first recirculation circuit) is preferably realized for transferring a portion of a liquid from a bottom region of the tub to the same bottom region for mixing and/or dissolution of the products, as better described below.

In general, the mixing circuit (first recirculation circuit) is preferably realized for transferring liquid from a bottom region of the tub and for re-admitting such a liquid into the washing tub such that at least a portion of the re-admitted liquid reaches the bottom region of the washing tub without entering the washing drum. More preferably, the mixing circuit (first recirculation circuit) is preferably realized for transferring liquid from a bottom region of the tub and for re-admitting such a liquid into the washing tub such that all, or substantially all, the re-admitted liquid reaches the bottom region of the washing tub without entering the washing drum.

Laundry washing machine 1 preferably comprises a second recirculation circuit 20 adapted to drain liquid from the bottom region 3a of the tub 3 and to re-admit such a liquid into a second region 3b, or upper region, of the tub 3.

Figure 3:
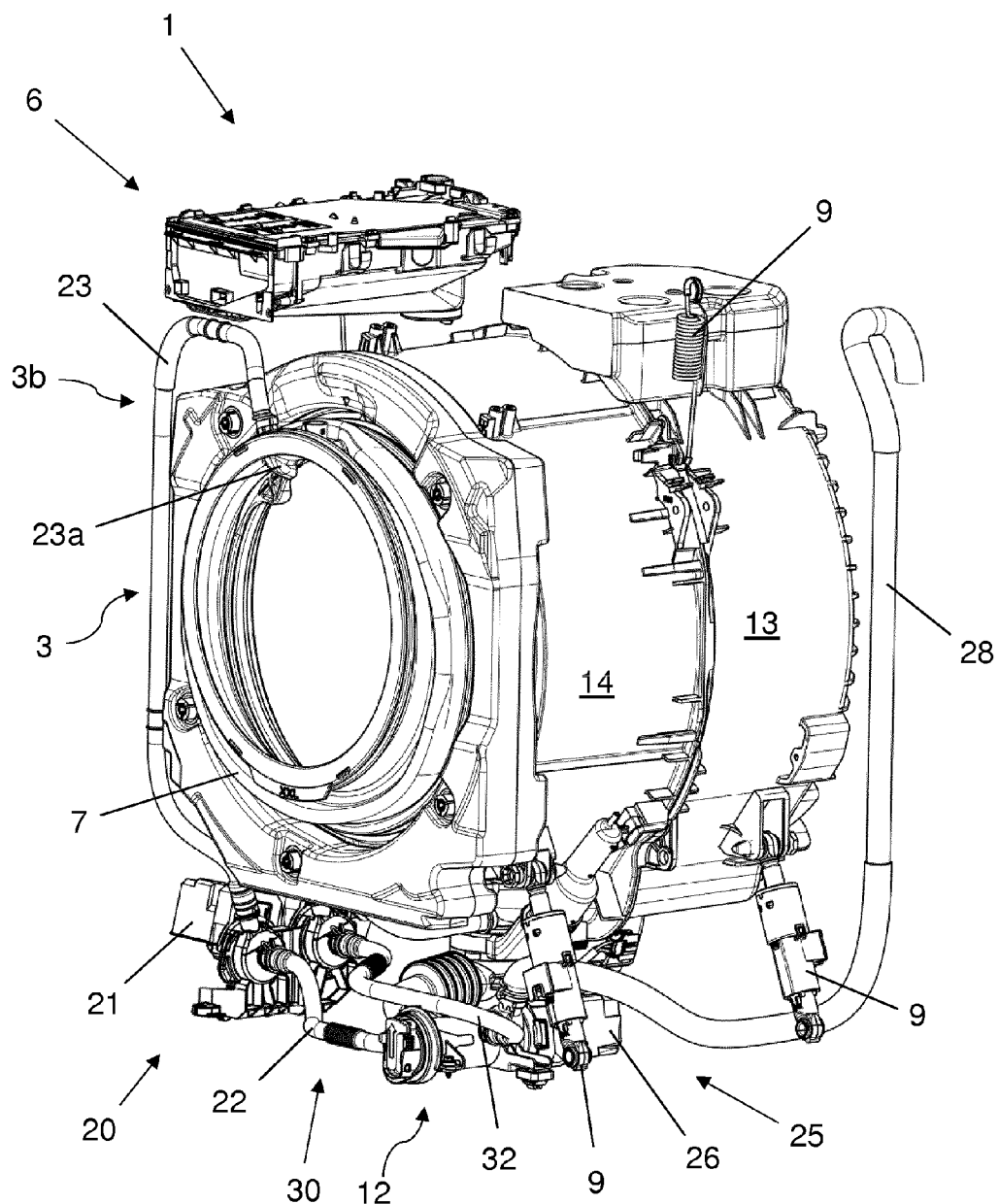
FIG. 3 shows the laundry washing machine of FIG. 1 with the external casing removed.

The second recirculation circuit 20 preferably comprises a second recirculation pump 21, a second pipe 22 connecting the filtering device 12 to the second recirculation pump 21 and a second recirculation pipe 23, preferably provided with a terminal nozzle 23a arranged preferably at the upper region 3b of the tub 3. The terminal nozzle 23a is opportunely arranged so that the liquid is sprayed directly into the drum 4. More preferably the terminal nozzle 23a is integrally formed in the bellows 7, as visible in FIG. 3, and the liquid is therefore advantageously sprayed in a direction the center of the perforated drum 4.

The terminal nozzle 23a, therefore, enhances distribution of liquid over the laundry through the perforated drum 4.

The liquid from the bottom region 3a of the tub 3 is conveyed towards the upper region 3b of the tub 3 by activation of the second recirculation pump 21.

The second recirculation circuit 20 is advantageously activated in order to improve wetting of the laundry inside the drum 4 and for reducing the water required in the whole washing program.

In general, the second recirculation circuit is properly realized for transferring a portion of a liquid from a bottom region of the tub, preferably from the sump, to an upper region of the tub in order to enhance absorption of the liquid by the laundry.

Advantageously, laundry washing machine 1 comprises a device 19 suited to sense (or detect) the liquid level inside the tub 3.

The sensor device 19 preferably comprises a pressure sensor which senses the pressure in the tub 3. From the values sensed by the sensor device 19 it is possible to determine the liquid level of the liquid inside the tub 3. In another embodiment, not illustrated, laundry washing machine may preferably comprise (in addition to or as a replacement of the pressure sensor) a level sensor (for example mechanical, electro-mechanical, optical, etc.) adapted to sense (or detect) the liquid level inside the tub 3.

Laundry washing machine 1 advantageously comprises a control unit, not illustrated, connected to the various parts of the laundry washing machine 1 in order to ensure its operation. The control unit is preferably connected to the water inlet circuit 5, the water outlet circuit 25, the recirculation circuits 30, 20, the heating device 10 and the electric motor and receives information from the various sensors provided on the laundry washing machine 1, like the pressure sensor 19, a temperature sensor, etc.

Laundry washing machine 1 advantageously comprises an interface unit 12, connected to control unit, accessible to the user and by means of which the user may select and set the washing parameters, like for example a desired washing program. Usually, other parameters can optionally be inserted by the user, for example the washing temperature, the spinning speed, the load in terms of weight of the laundry to be washed, etc.

Based on the parameters acquired by said interface 12, the control unit sets and controls the various parts of the laundry washing machine 1 in order to carry out the desired washing program.

A first embodiment of the treating method according to the invention is described here below with reference to FIGS. 7 and 8.

Figure 7:
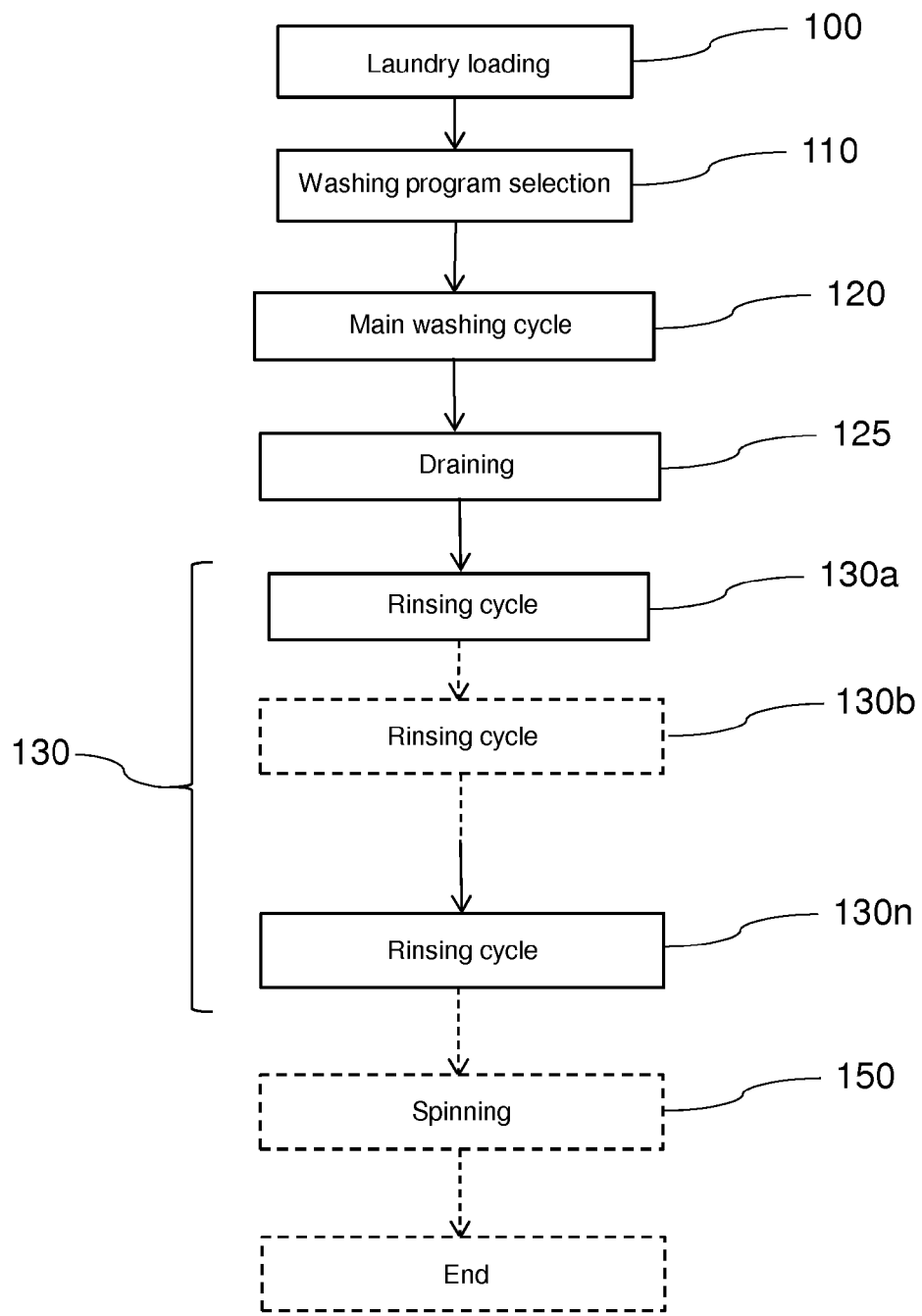
FIG. 7 is a simplified flow chart of the basic operations of a method for washing laundry in the laundry washing machine of FIG. 2 according to a first embodiment of the invention.
Figure 8:
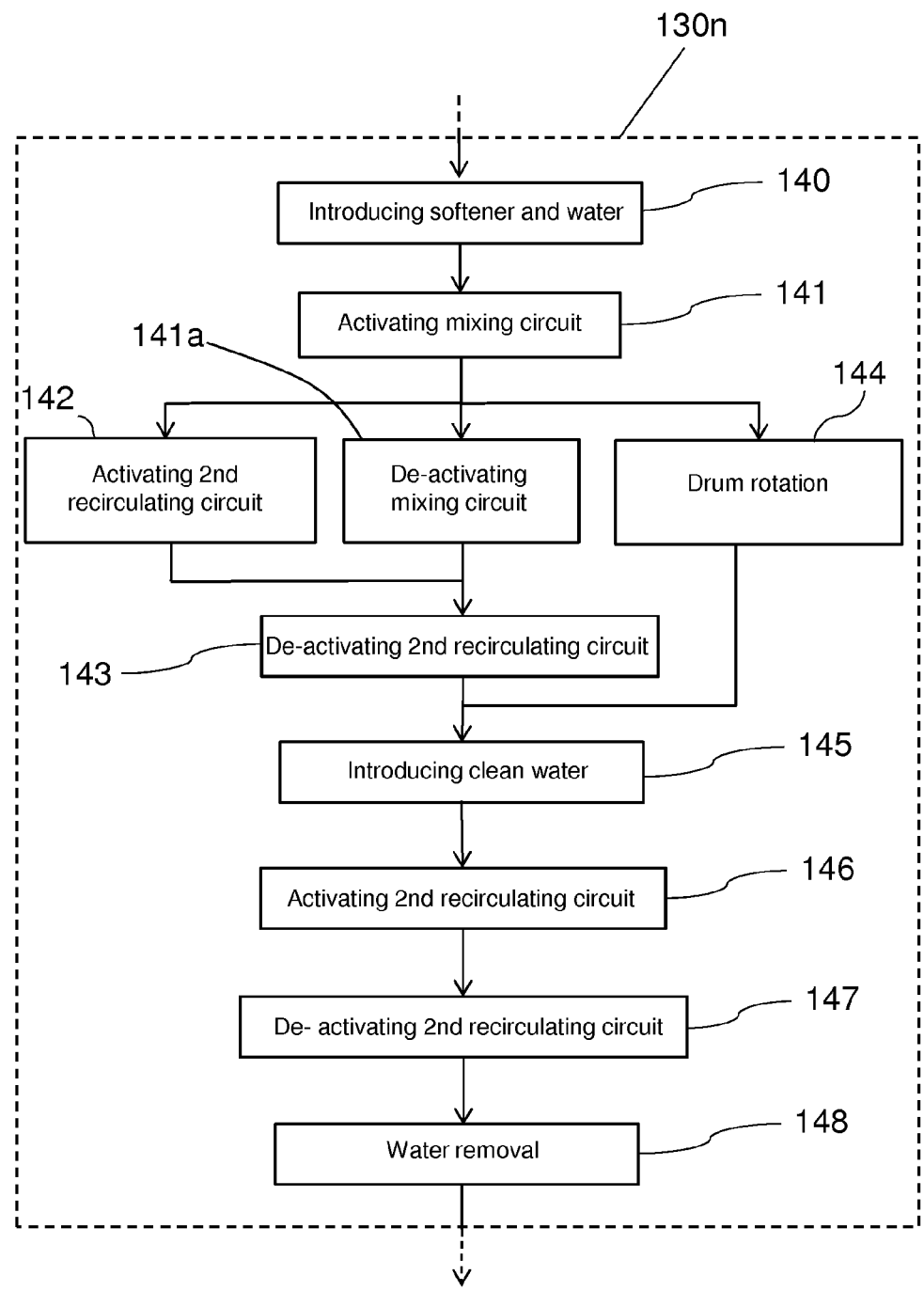
FIG. 8 shows a detail of FIG. 7.

The laundry to be washed is first placed inside the drum 4 (step 100 of FIG. 7).

The user fills the compartments of the drawer 6 with the products needed for treatment of the laundry, i.e. detergent D and softener S.

By operating on the interface unit 12 the user selects the desired washing program (step 110) depending, for example, on the type and on the dirty-level of the products to wash. Furthermore, as said before, in a preferred embodiment it is possible for the user to insert some parameters directly by the interface unit 12, for example the value of the washing temperature, the rotating speed of the drum 4 in the spinning phase, the duration of the washing program, etc.

Once the user has selected the desired washing program, the control unit sets the laundry washing machine 1 so that it starts the washing program.

In a further embodiment, the selection of the desired washing program (step 110) may be performed before placing the laundry into the drum 4 (step 100).

In a successive phase (step 120) the laundry is subjected to a main washing cycle. The main washing cycle may be carried out according to any prior art technique and therefore it will not be described in detail. During the main washing cycle the laundry is washed with introduction of water and detergent D into the washing tub 3 and tumbled by rotation of the washing drum 4. During the washing cycle, the water and the detergent D are advantageously and preferably heated at a proper temperature by means of the heating device 10.

At the end of the main washing cycle (step 120), the dirty washing liquid is advantageously drained to the outside by activating the drain pump 26 of the water outlet circuit 25 (step 125).

Preferably, at the end of the main washing cycle (step 120) the drum 4 is also typically rotated at a preferred rotational speed (for example about 150-250 rpm) in such a way that further dirty washing liquid (i.e. water mixed with detergent D) is extracted from the laundry.

The extracted dirty washing liquid is advantageously drained to the outside by said drain pump 26 of the water outlet circuit 25 (step 125).

After the draining step (step 125) at the end of the main washing cycle (step 120), the method comprises a rinsing phase, globally indicated with 130, which may comprise one or more rinsing cycles (steps 130a, 130b, . . . , 130n).

In a rinsing cycle, clean rinse water may be first added to the laundry, so as to be absorbed by the laundry. The clean water removes from the laundry the residual detergent D and/or dirty particles of the main washing cycle. The drum 4 is then rotated to extract water and dirty particles/detergent from the laundry: the dirty water extracted is drained from the tub 3 to the outside preferably by activating the drain pump 26 of the water outlet circuit 25.

According to aspects of the invention, in a particular rinsing cycle (step 130a, 130b, . . . , 130n), preferably in the last rinsing cycle (step 130n), the laundry is subjected to a treatment with a dose of a rinse additive.

In the preferred embodiment here described, the laundry is subjected to a treatment with a dose of softener S. In this case, the laundry is preferably subjected to the treatment with the softener S in the last rinsing cycle (step 130n). In different further embodiments, nevertheless, the laundry may be treated with a different rinse additive, such as a fabric conditioner, a waterproofing agent, a fabric enhancer, a rinse sanitization additive, a chlorine-based additive, opportunely disposed inside a dedicated compartment of the drawer 6 at the beginning of the washing program.

For example, if a chlorine-based additive is used, the laundry is preferably subjected to a sanitization treatment with this additive in the first rinsing cycle (step 130a).

The rinsing cycle (130n) according to aspects of the invention are better described with reference to FIG. 8. For simplicity's sake, hereinafter we will refer to the last rinsing cycle (130n). It is clear that aspects of the invention may be referred to any of the rinsing cycle (step 130a, 130b, . . . , 130n).

In a first phase (step 140) a quantity Qs of softener S together with a first quantity Q1w of water W is introduced into the tub 3. The quantity Qs of softener S may be for example about 50 ml, if liquid softener is used, and the first quantity Q1w of water W may be for example about 5 or 6 liters.

The introduction of the quantity Qs of softener S takes place preferably through the rinse additive supplier 70; the quantity Qs of softener S, be it powder or liquid, is preferably brought out of the apposite compartment of the drawer 6 by the first quantity Q1w of water W that passes through the proper compartment of the drawer 6.

The first quantity Q1w of water W is conveyed to the proper compartment of the drawer 6 by activating (opening) the supply valve 5a of the water supply circuit 5.

In order to convey all the first quantity Q1w of water W (for example said 5 or 6 liters) the supply valve 5a is activated for a predetermined water supplying time, for example 60-90 sec.

The water supplying time obviously depends on the flow rate of the supply valve 5a.

The quantity Qs of softener S and the first quantity Q1w of water W are introduced into the tub 3 through the supply pipe 18.

In different embodiments, the quantity Qs of softener S and the first quantity Q1w of water W may be advantageously introduced singularly into the tub 3 in different times.

The quantity Qs of softener S and/or the first quantity Q1w of water W introduced into the tub 3 in said phase (step 140) fall down on the bottom region 3a of the tub 3 by flowing inside the gap 55 between the tub 3 and the drum 4.

A small quantity of softener S and/or a small quantity of water W introduced into the tub 3 and flowing inside the gap 55 may enter the drum 4, due to the position of the supply pipe 18.

A relevant quantity of softener S and water W introduced into the tub 3 reach in any case the bottom region 3a of the tub 3, filling the sump 15.

Therefore almost all the softener S and/or the water W reaches the bottom region 3a of the tub 3 with a minimum absorption from the laundry arranged inside the drum 4.

According to aspects of the invention, during the rinsing cycle (step 130n) the mixing circuit 30 is activated (step 141).

Activation of the mixing circuit 30 is advantageously carried out through activation of the first recirculation pump 31.

In a first preferred embodiment of the invention, activation of the mixing circuit 30 preferably starts at the same time of activation of the supply valve 5a.

In a further preferred embodiment of the invention, activation of the mixing circuit 30 more preferably starts after a delay time from activation of the supply valve 5a, for example after a delay time of 10 sec. In this case, the delay time ensures that the first recirculation pump 31 is working properly, i.e. guarantees that a quantity of liquid (softener S and/or water W) reaches the sump 15 when the first recirculation pump 31 is activated.

In different embodiments, nevertheless, the activation of the mixing circuit 30 may start even before activation of the supply valve 5a or, on the contrary, activation of the mixing circuit 30 may start after the supply valve 5a has been de-activated (closed). In the latter, the mixing circuit 30 is activated after all the quantity Qs of softener S and all the first quantity Q1w of water W have been introduced into the tub 3.

When the mixing circuit 30 is activated (step 141), the liquid (water W and softener S) is drained from the bottom region 3a of the tub 3 and re-admitted into to the same bottom region 3a of the tub 3. In particular, the liquid (water W and softener S) is drained from sump 15 and re-admitted again into the sump 15. More preferably, the liquid (water W and softener S) is drained from sump 15 and re-admitted again into the sump 15 below the heating device 10.

Activation of the mixing circuit 30 advantageously mixes the softener S and the water W at the bottom region 3a of the tub 3, more preferably inside the sump 15.

The mixing action causes the quantity Qs of softener S to be properly and homogeneously diluted in the first quantity Q1w of water W.

This is particularly advantageous when the softener S is in a concentrated or a super concentrated form.

During activation of the mixing circuit 30 (step 141), therefore, a homogeneous liquid mixture of softener S and water W is prepared at the bottom region 3a of the tub 3.

After a predetermined mixing time, for example 60-80 sec, the liquid mixture may be considered ready to be conveyed on the laundry inside the drum 4.

In the preferred embodiment here described, the mixing circuit 30 is advantageously activated without any interruption, i.e. activated continuously for 60 sec. In different embodiments, nevertheless, the mixing circuit 30 may be activated intermittently. The mixing time is therefore obtained as the sum of the times in the successive activations.

In the preferred embodiment here described, after the introduction of all the softener S and all the first quantity Q1w of water W inside the tub 3 (step 140) and after the mixing phase (step 141), the liquid mixture at the bottom region 3a of the tub 3 reaches a level Lm. The level Lm is in this case a level at which the liquid mixture partially touches the drum 4, i.e. a level Lm which is above the lower point of the drum 4.

The level Lm depends on the quantity Qs of softener S and on the first quantity Q1w of water W previously introduced into the washing tub 3. The level Lm obviously depends also on the physical form of the tub 3 and/or of the drum 4.

The liquid mixture touching the drum 4 may therefore partially enter the perforated drum 4 through the holes of the drum 4 and absorbed by the laundry.

This liquid mixture absorbed by the laundry is advantageously a homogeneous liquid mixture obtained by the previous activation of the mixing circuit 30 (step 141). The laundry therefore absorbs the liquid mixture and the softener S binds to laundry. This improves the efficiency of the softener S on the laundry with respect to the known technique where the softener S not diluted reaches the load.

In a different preferred embodiment, the quantity Qs of softener S and the first quantity Q1$w$ of water W may be adjusted to advantageously maintain the level L'm of the liquid mixture below the lower point of the drum 4, as illustrated in FIG. 2.

In this case, activation of the mixing circuit 30 (step 141) creates a homogeneous liquid mixture of softener S and water W at the bottom region 3*a* of the tub 3 and the liquid mixture does not enter, or substantially does not enter, the perforated drum 4.

In the preferred embodiment of the method here described, the liquid mixture obtained in the mixing step (step 141), which lies at the bottom region 3*a* of the tub 3 up to said particular level Lm, L'm, is then preferably conveyed on the laundry activating the second recirculation circuit 20 (step 142).

Activation of the second recirculation circuit 20 is advantageously carried out through activation of the second recirculation pump 21 for a proper period of time.

At this stage, the mixing circuit 30 is preferably deactivated (step 141*a*).

When the second recirculation circuit 20 is activated (step 142), the liquid mixture from the bottom region 3*a* of the tub 3 is drained towards the upper region 3*b* of the tub 3 by means of the second recirculation pump 21. The second recirculation pump 21 takes the liquid mixture from the sump 15 and conveys it towards the upper region 3*b* of the tub 3 through the second recirculation pipe 23. The homogenous liquid mixture from the second recirculation pipe 23, and advantageously from its terminal nozzle 23*a*, is sprayed into the drum 4 over the laundry. During this phase, the laundry absorbs the liquid mixture, the softener S binds to laundry and the level of the liquid mixture inside the tub 3 decreases.

Advantageously, the softener S is distributed on the laundry items in a more homogenous form with respect to the known technique. This improves the efficiency of the softener S on the laundry.

The second recirculation circuit 20 is preferably deactivated (step 143) when the liquid level inside the tub 3 reaches a level which is advantageously set at the bottom of the sump 15, i.e. when the liquid mixture is substantially totally drained and the tub 3 is substantially empty.

This happen when the laundry inside the drum 4 has substantially absorbed all the liquid mixture.

In a further preferred embodiment, the second recirculation circuit 20 is preferably deactivated after a preset period of time, for example 60 sec.

The preset period of time may be an estimated period of time which is considered to be sufficient for draining all, or substantially all, the liquid mixture from the sump 15.

During the recirculation process (step 142) the drum 4 is advantageously set rotated (step 144) so as to enhance the absorption of the liquid mixture by the laundry inside the drum 4.

Preferably, the drum 4 is advantageously set rotated both during and after the recirculation process (step 142).

More preferably, the drum 4 is advantageously set rotated (step 144) for a preset period of time, for example 4 min, during which the softener S optimally binds to tumbled laundry.

Once the recirculation step (step 143) and the tumble step (step 144) are terminated, a second quantity Q2$w$ of clean water W is preferably introduced into the tub 3 (step 145). The second quantity Q2$w$ of clean water W may be, for example, about 7 liters.

The introduction of the second quantity Q2$w$ of clean water W takes place preferably through the water inlet circuit 5 with activation of the supply valve 5*a*. In order to convey all the second quantity Q2$w$ of water W (for example said 7 liters) the supply valve 5*a* is activated for a predetermined water supplying time, for example 70-100 sec.

The clean water W preferably passes through an empty compartment of the drawer 6.

In different embodiments where a bypass circuit is provided, the second quantity Q2$w$ of water W may be advantageously introduced directly into the tub 3 bypassing the drawer 6.

The second recirculation circuit 20 is then activated (step 146) and the clean water W from the sump 15 is drained towards the upper region 3*b* of the tub 3 by means of the second recirculation pump 21.

The clean water W is thus sprayed over the laundry through the terminal nozzle 23*a*. During the recirculation step (step 146) the drum 4 is preferably set rotated so as to enhance the absorption of clean water W.

Once the recirculation step is terminated (step 147), the water W is removed from the laundry (step 148). The removal of water W (step 148) preferably comprises a spinning phase during which the drum 4 is rotated at high speed (for example about 800-1500 rpm) to obtain the extraction of the water from the laundry. At the same time, the drain pump 26 is activated to drain the liquid from the tub 3 to the outside through the outlet pipe 28.

In the preferred embodiment here described, the rinsing cycle (step 130*n*) and the washing program after said removing step (step 148) may be considered terminated.

In different embodiments, nevertheless, the washing program may comprise one or more further spinning phases (as indicate with reference sign 150 in FIG. 7) for the extraction of the residual water contained in the wet laundry.

It should be noted that in a further preferred embodiment of the invention, the phase of introducing a second quantity of clean water into the tub may be omitted. In this preferred embodiment, the steps (step 145, step 146 and step 147) of introducing and re-circulating the second quantity of clean water may be advantageously omitted.

Figure 9:
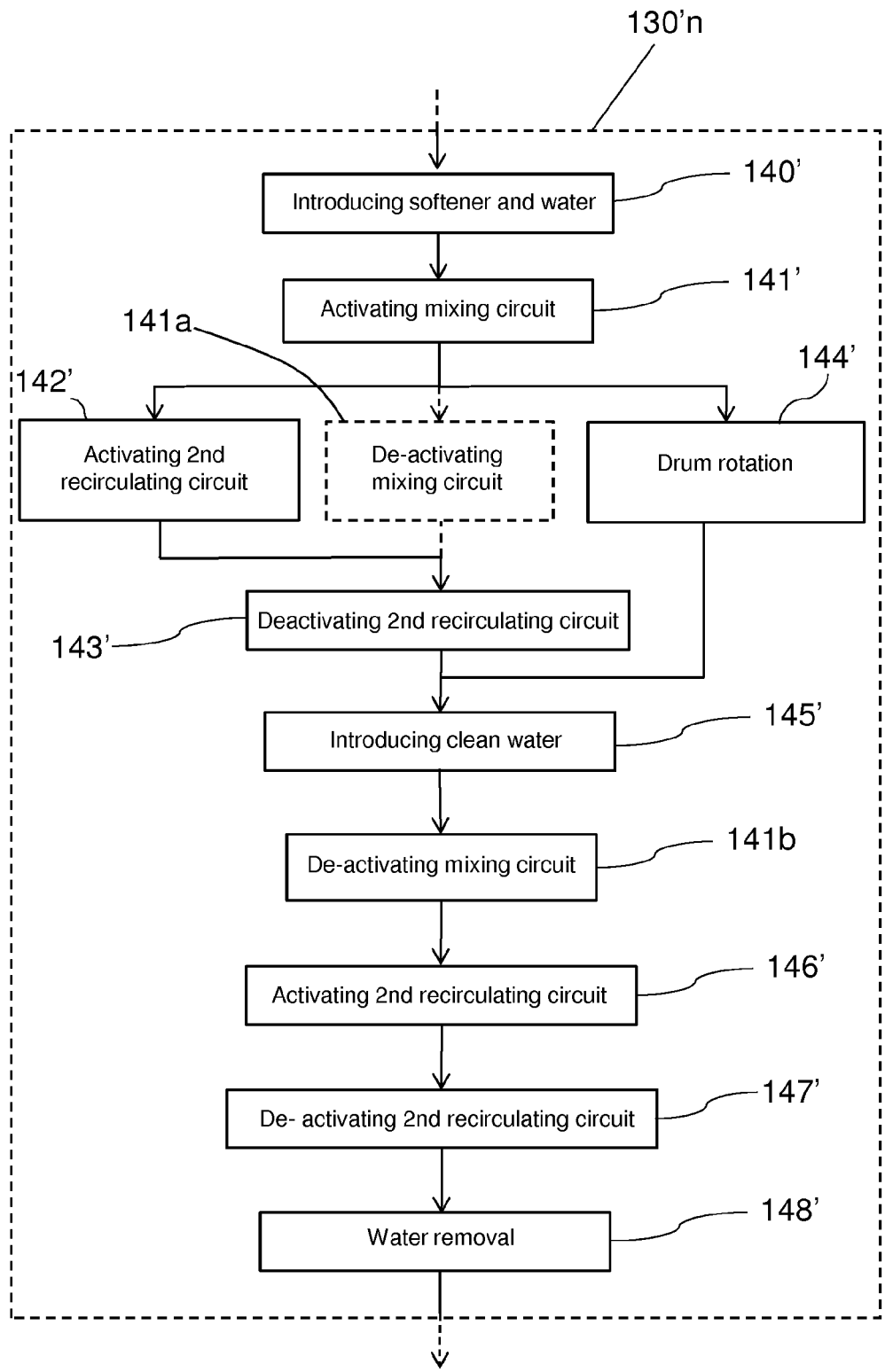
FIG. 9 shows a further embodiment of FIG. 8.

FIG. 9 shows the flow chart of a further embodiment of the rinsing cycle (step 130'*n*) according to aspects of the invention.

In a first phase (step 140') a quantity Qs of softener S together with a first quantity Q1$w$ of water W is introduced into the tub 3. The quantity Qs of softener S may be for example about 50 ml, if liquid softener is used, and the first quantity Q1$w$ of water W may be for example about 5 or 6 liters.

The introduction of the quantity Qs of softener S takes place preferably through the rinse additive supplier 70; the quantity Qs of softener S, be it powder or liquid, is preferably brought out of the apposite compartment of the drawer 6 by the first quantity Q1$w$ of water W that passes through the proper compartment of the drawer 6.

The first quantity Q1w of water W is conveyed to the proper compartment of the drawer 6 by activating (opening) the supply valve 5a of the water supply circuit 5.

In order to convey all the first quantity Q1w of water W (for example said 5 or 6 liters) the supply valve 5a is activated for a predetermined water supplying time, for example 60-100 sec.

The water supplying time obviously depends on the flow rate of the supply valve 5a.

The quantity Qs of softener S and the first quantity Q1w of water W are introduced into the tub 3 through the supply pipe 18.

In different embodiments, the quantity Qs of softener S and the first quantity Q1w of water W may be advantageously introduced singularly into the tub 3 in different times.

The quantity Qs of softener S and/or the first quantity Q1w of water W introduced into the tub 3 in said phase (step 140') fall down on the bottom region 3a of the tub 3 by flowing inside the gap 55 between the tub 3 and the drum 4.

A small quantity of softener S and/or a small quantity of water W introduced into the tub 3 and flowing inside the gap 55 may enter the drum 4, due to the position of the supply pipe 18.

A relevant quantity of softener S and water W introduced into the tub 3 reach in any case the bottom region 3a of the tub 3, filling the sump 15.

Therefore almost all the softener S and/or the water W reaches the bottom region 3a of the tub 3 with a minimum absorption from the laundry arranged inside the drum 4.

According to aspects of the invention, during the rinsing cycle (step 130'n) the mixing circuit 30 is activated (step 141').

Activation of the mixing circuit 30 is advantageously carried out through activation of the first recirculation pump 31.

In a first preferred embodiment of the invention, activation of the mixing circuit 30 preferably starts at the same time of activation of the supply valve 5a.

In a further preferred embodiment of the invention, activation of the mixing circuit 30 more preferably starts after a delay time from activation of the supply valve 5a, for example after a delay time of 10 sec. In this case, the delay time ensures that the first recirculation pump 31 is working properly, i.e. guarantees that a quantity of liquid (softener S and/or water W) reaches the sump 15 when the first recirculation pump 31 is activated.

In different embodiments, nevertheless, the activation of the mixing circuit 30 may start even before activation of the supply valve 5a or, on the contrary, activation of the mixing circuit 30 may start after the supply valve 5a has been de-activated (closed). In the latter, the mixing circuit 30 is activated after all the quantity Qs of softener S and all the first quantity Q1w of water W have been introduced into the tub 3.

When the mixing circuit 30 is activated (step 141'), the liquid (water W and softener S) is drained from the bottom region 3a of the tub 3 and re-admitted into to the same bottom region 3a of the tub 3. In particular, the liquid (water W and softener S) is drained from sump 15 and re-admitted again into the sump 15. More preferably, the liquid (water W and softener S) is drained from sump 15 and re-admitted again into the sump 15 below the heating device 10.

Activation of the mixing circuit 30 advantageously mixes the softener S and the water W at the bottom region 3a of the tub 3, more preferably inside the sump 15.

The mixing action causes the quantity Qs of softener S to be properly and homogeneously diluted in the first quantity Q1w of water W.

This is particularly advantageous when the softener S is in a concentrated or a super concentrated form.

During activation of the mixing circuit 30 (step 141'), therefore, a homogeneous liquid mixture of softener S and water W is prepared at the bottom region 3a of the tub 3.

After a predetermined mixing time, for example 60-80 sec, the liquid mixture may be considered ready to be conveyed on the laundry inside the drum 4.

In the preferred embodiment here described, the mixing circuit 30 is advantageously activated without any interruption, i.e. activated continuously for 60 sec. In different embodiments, nevertheless, the mixing circuit 30 may be activated intermittently. The mixing time is therefore obtained as the sum of the times in the successive activations.

In the preferred embodiment here described, after the introduction of all the softener S and all the first quantity Q1w of water W inside the tub 3 (step 140') and after the mixing phase (step 141'), the liquid mixture at the bottom region 3a of the tub 3 reaches a level Lm. The level Lm is in this case a level at which the liquid mixture partially touches the drum 4, i.e. a level Lm which is above the lower point of the drum 4.

The level Lm depends on the quantity Qs of softener S and on the first quantity Q1w of water W previously introduced into the washing tub 3. The level Lm obviously depends also on the physical form of the tub 3 and/or of the drum 4.

The liquid mixture touching the drum 4 may therefore partially enter the perforated drum 4 through the holes of the drum 4 and absorbed by the laundry.

This liquid mixture absorbed by the laundry is advantageously a homogeneous liquid mixture obtained by the previous activation of the mixing circuit 30 (step 141'). The laundry therefore absorbs the liquid mixture and the softener S binds to laundry. This improves the efficiency of the softener S on the laundry with respect to the known technique where the softener S not diluted reaches the load.

In a different preferred embodiment, the quantity Qs of softener S and the first quantity Q1w of water W may be adjusted to advantageously maintain the level L'm of the liquid mixture below the lower point of the drum 4, as illustrated in FIG. 2.

In this case, activation of the mixing circuit 30 (step 141') creates a homogeneous liquid mixture of softener S and water W at the bottom region 3a of the tub 3 and the liquid mixture does not enter, or substantially does not enter, the perforated drum 4.

In the preferred embodiment of the method here described, the liquid mixture obtained in the mixing step (step 141'), which lies at the bottom region 3a of the tub 3 up to said particular level Lm, L'm, is then is then preferably partially conveyed on the laundry activating the second recirculation circuit 20 (step 142').

Activation of the second recirculation circuit 20 is advantageously carried out through activation of the second recirculation pump 21 for a proper period of time.

At this stage, the mixing circuit 30 may be de-activated (step 141'a). In the preferred embodiment here described, nevertheless, the mixing circuit 30 is kept working. De-activation of the mixing circuit 30 (step 141'b) is preferably carried out successively during the washing program, as described below.

When the second recirculation circuit 20 is activated (step 142'), the liquid mixture from the bottom region 3a of the tub 3 is drained towards the upper region 3b of the tub 3 by means of the second recirculation pump 21. The second recirculation pump 21 takes the liquid mixture from the sump 15 and conveys it towards the upper region 3b of the tub 3 through the second recirculation pipe 23. The homogenous liquid mixture from the second recirculation pipe 23, and advantageously from its terminal nozzle 23a, is sprayed into the perforated drum 4 and over the laundry. During this phase, the laundry absorbs the liquid mixture, the softener S binds to laundry and the liquid mixture inside the tub 3 decreases to a new level Ls.

Advantageously, the softener S is distributed on the laundry items in a more homogenous form with respect to the known technique. This improves the efficiency of the softener S on the laundry.

The second recirculation circuit 20 is preferably deactivated (step 143') when the liquid level inside the tub 3 reaches the new level Ls. The new level Ls is preferably substantially at the lower point of the drum 4, as illustrated in FIG. 2.

In a further preferred embodiment, the second recirculation circuit 20 is preferably deactivated after a preset period of time, for example 30 sec.

The preset period of time may be an estimated period of time which is considered to be sufficient the liquid mixture reaches the new level Ls.

In further preferred embodiments, nevertheless, the new level Ls may be different, below or above the lower point of the drum 4.

During the recirculation process (step 142') the drum 4 is advantageously set rotated (step 144') so as to enhance the absorption of the liquid mixture by the laundry inside the drum 4.

Preferably, the drum 4 is advantageously set rotated both during and after the recirculation process (step 142').

More preferably, the drum 4 is advantageously set rotated (step 144') for a preset period of time, for example 4 min, during which the softener S optimally binds to tumbled laundry.

During this drum rotation phase (step 144'), advantageously, a further quantity of liquid mixture directly enters the perforated drum 4 through the holes of the drum 4 and then absorbed by the laundry. This liquid mixture absorbed by the laundry is advantageously a homogeneous mixture. This improves the efficiency of the softener S on the laundry with respect to the known technique where the softener S not diluted reaches the load.

Once the recirculation step (step 143') and the tumble step (step 144') are terminated, a second quantity Q2w of clean water W is preferably introduced into the tub 3 (step 145'). The second quantity Q2w of clean water W may be, for example, about 7 liters.

The introduction of the second quantity Q2w of clean water W takes place preferably through the water inlet circuit 5 with activation of the supply valve 5a. The clean water W preferably passes through an empty compartment of the drawer 6.

In different embodiments where a bypass circuit is provided, the second quantity Q2w of water W may be advantageously introduced directly into the tub 3 bypassing the drawer 6.

The second quantity Q2w of water W reaches the bottom region 3a of the tub 3 and is here added to the liquid mixture.

In the preferred embodiment here described, the mixing circuit 30 is still activated (step 141') and the liquid mixture is further mixed with the second quantity Q2w of water W.

The mixing action causes the liquid mixture to be further diluted with the second quantity Q2w of water W.

In case the mixing circuit 30 was previously de-activated (step 141a), the method preferably provide for the activation of the mixing circuit 30 for mixing the liquid mixture with the second quantity Q2w of water W introduced in the tub 3.

After a predetermined mixing time, for example 60-80 sec, the mixing circuit 30 is preferably de-activated (step 141b).

The second recirculation circuit 20 is then activated (step 146') and the diluted liquid from the sump 15 is drained towards the upper region 3b of the tub 3 by means of the second recirculation pump 21.

The diluted liquid is thus sprayed over the laundry through the terminal nozzle 23a. During the recirculation step (step 146') the drum 4 is preferably set rotated so as to enhance the absorption of clean water W.

Once the recirculation step is terminated (step 147'), the water W is removed from the laundry (step 148'). The removal of water W (step 148') preferably comprises a spinning phase during which the drum 4 is rotated at high speed (for example about 800-1500 rpm) to obtain the extraction of the water from the laundry. At the same time, the drain pump 26 is activated to drain the liquid from the tub 3 to the outside through the outlet pipe 28.

In the preferred embodiment here described, the rinsing cycle (step 130n') and the washing program after said removing step (step 148') may be considered terminated.

In different embodiments, nevertheless, the washing program may comprise one or more further spinning phases (as indicate with reference sign 150 in FIG. 7) for the extraction of the residual water contained in the wet laundry.

Figure 10:
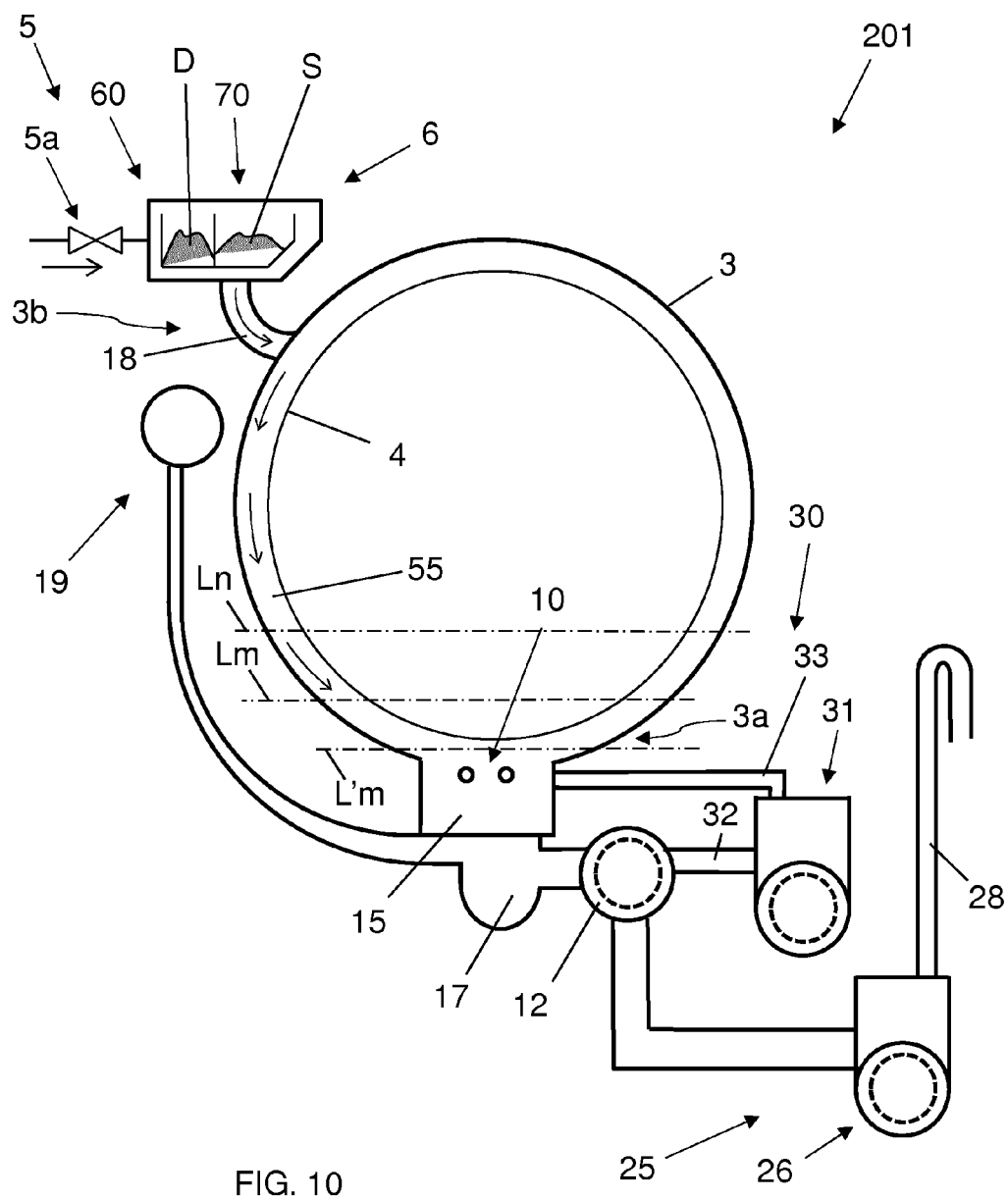
FIG. 10 shows a schematic view of a further preferred embodiment of a laundry washing machine implementing the method according to the present invention.

FIG. 10 shows a schematic view of a further embodiment of a laundry washing machine 201 wherein a method according to aspects of the present invention may be performed.

The laundry washing machine 201 differs from the laundry washing machine 1 previously described in particular with reference to FIG. 2 in that the second recirculation circuit 20 is omitted.

The washing method performed in laundry washing machine 201 is described here below with reference to FIGS. 11 and 12.

Phases and/or steps with the same reference numbers of the first embodiment correspond to phases and/or steps described above for the first embodiment.

Figure 11:
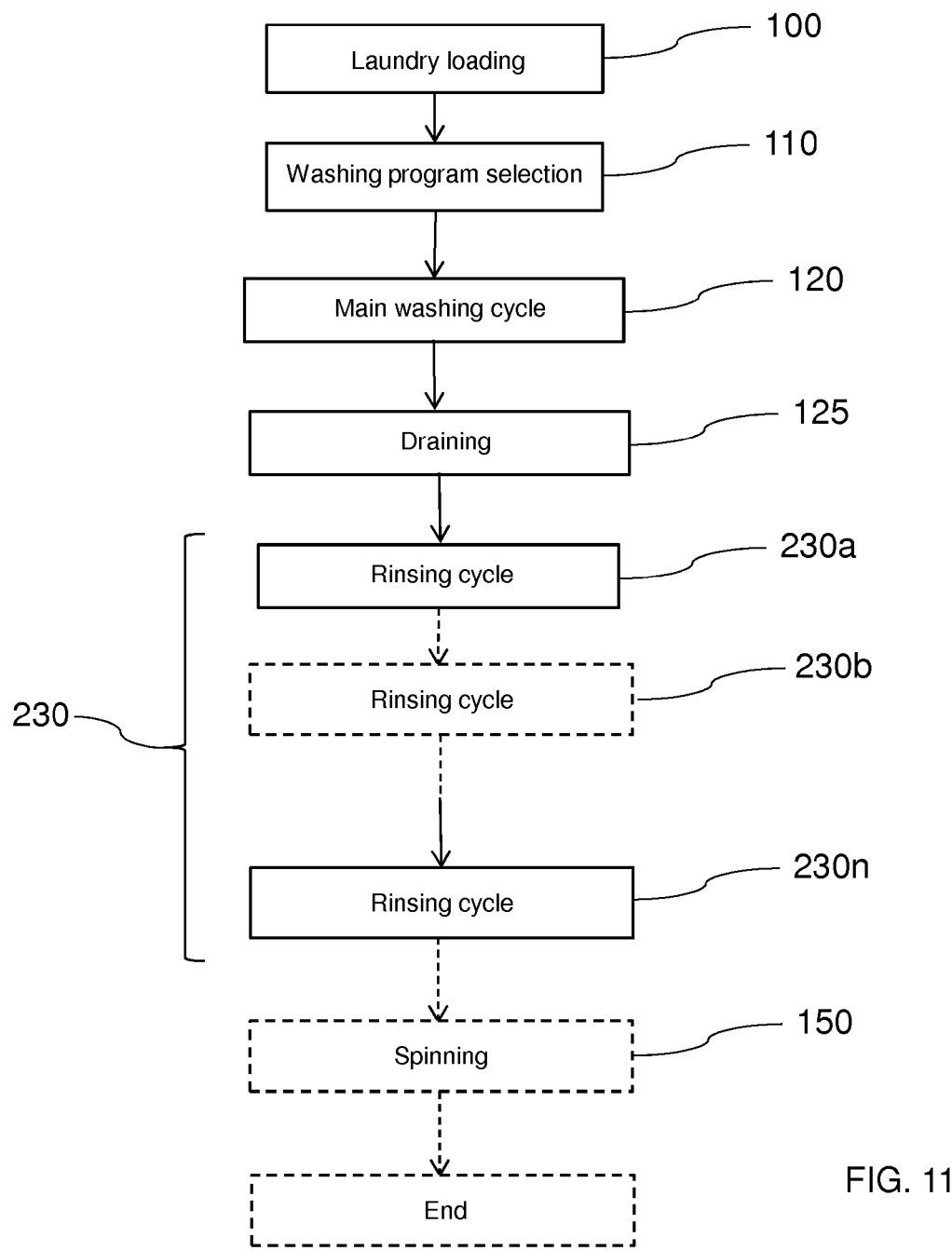
FIG. 11 is a simplified flow chart of the basic operations of a method for washing laundry in the laundry washing machine of FIG. 10.
Figure 12:
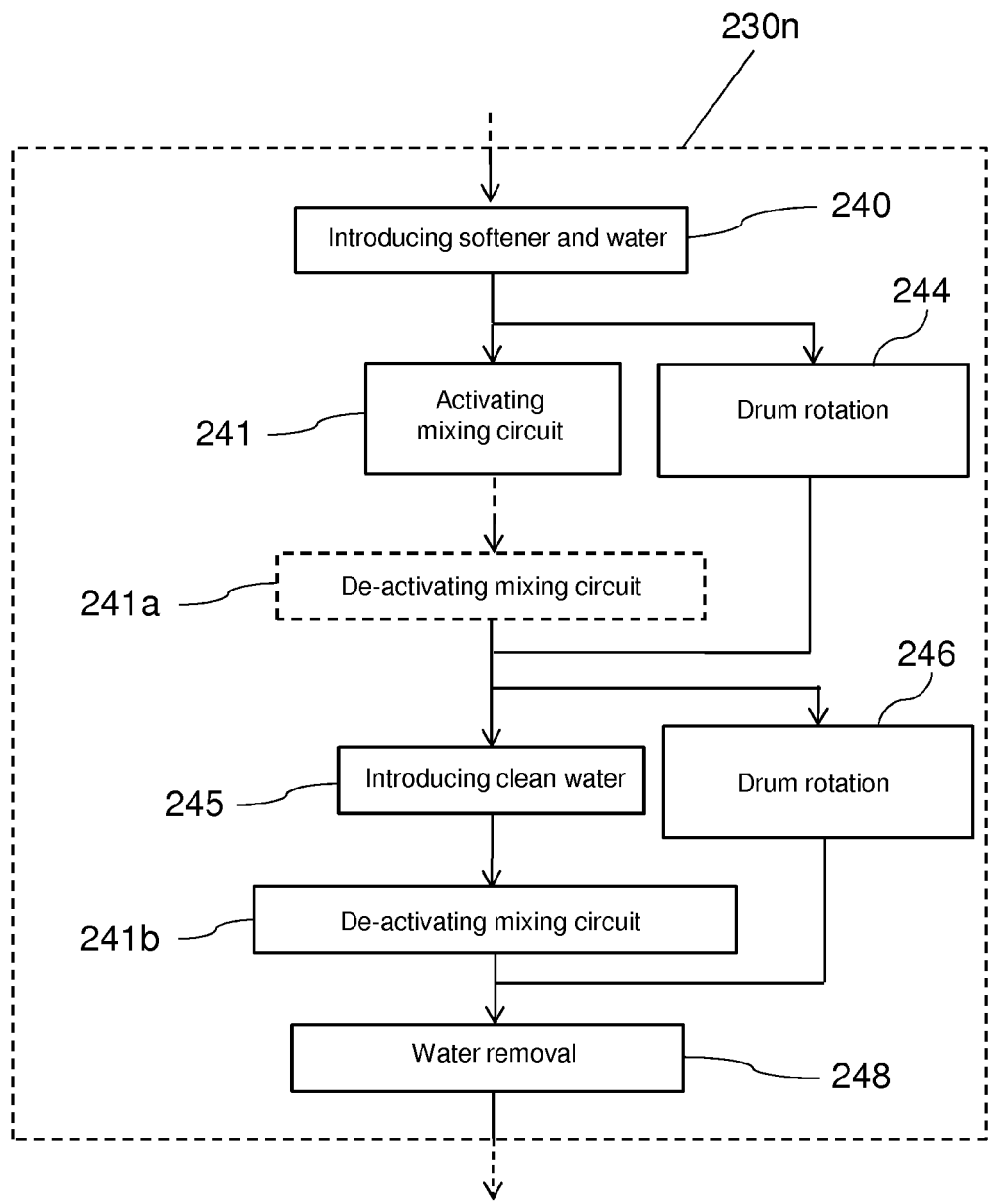
FIG. 12 shows a detail of FIG. 11.

The laundry to be washed is first placed inside the drum 4 (step 100 of FIG. 11).

The user fills the compartments of the drawer 6 with the products needed for treatment of the laundry, i.e. detergent D and softener S.

The user then selects the desired washing program (step 110).

Once the user has selected the desired washing program, the control unit sets the laundry washing machine 1 so that it starts the washing program.

In a successive phase (step 120) the laundry is subjected to a main washing cycle. At the end of the main washing cycle (step 120), the dirty washing liquid is advantageously drained to the outside by activating the drain pump 26 of the water outlet circuit 25 (step 125).

Preferably, at the end of the main washing cycle (step 120) the drum 4 is also typically rotated at a preferred rotational speed (for example about 150-250 rpm) in such a way that further dirty washing liquid (i.e. water mixed with detergent D) is extracted from the laundry.

The extracted dirty washing liquid is advantageously drained to the outside by said drain pump 26 of the water outlet circuit 25 (step 125).

After the draining step (step 125) at the end of the main washing cycle (step 120), the method comprises a rinsing phase, globally indicated with 230, which may comprise one or more rinsing cycles (steps 230*a*, 230*b*, . . . , 230*n*).

In a rinsing cycle, clean rinse water may be first added to the laundry, so as to be absorbed by the laundry. The clean water removes from the laundry the residual detergent D and/or dirty particles of the main washing cycle. The drum 4 is then rotated to extract water and dirty particles/detergent from the laundry: the dirty water extracted is drained from the tub 3 to the outside preferably by activating the drain pump 26 of the water outlet circuit 25.

According to aspects of the invention, in a particular rinsing cycle (step 230*a*, 230*b*, . . . , 230*n*), preferably in the last rinsing cycle (step 230*n*), the laundry is subjected to a treatment with a dose of a rinse additive.

In the preferred embodiment here described, the laundry is subjected to a treatment with a dose of softener S. In this case, the laundry is preferably subjected to the treatment with the softener S in the last rinsing cycle (step 230*n*). In different further embodiments, nevertheless, the laundry may be treated with a different rinse additive, such as a fabric conditioner, a waterproofing agent, a fabric enhancer, a rinse sanitization additive, a chlorine-based additive, opportunely disposed inside a dedicated compartment of the drawer 6 at the beginning of the washing program.

For example, if a chlorine-based additive is used, the laundry is preferably subjected to a sanitization treatment with this additive in the first rinsing cycle (step 230*a*).

The rinsing cycle (230*n*) according to aspects of the invention is better described with reference to FIG. 12. For simplicity's sake, hereinafter we will refer to the last rinsing cycle (230*n*). It is clear that aspects of the invention may be referred to any of the rinsing cycle (step 230*a*, 230*b*, . . . , 230*n*).

In a first phase (step 240) a quantity Qs of softener S together with a first quantity Q1*w* of water W is introduced into the tub 3. The quantity Qs of softener S may be for example about 50 ml, if liquid softener is used, and the first quantity Q1*w* of water W may be for example about 5 or 6 liters.

The introduction of the quantity Qs of softener S takes place preferably through the rinse additive supplier 70; the quantity Qs of softener S, be it powder or liquid, is preferably brought out of the apposite compartment of the drawer 6 by the first quantity Q1*w* of water W that passes through the proper compartment of the drawer 6.

The quantity Qs of softener S and the first quantity Q1*w* of water W are introduced into the tub 3 through the supply pipe 18.

In different embodiments, the quantity Qs of softener S and the first quantity Q1*w* of water W may be advantageously introduced singularly into the tub 3 in different times.

The quantity Qs of softener S and/or the first quantity Q1*w* of water W introduced into the tub 3 in said phase (step 240) fall down on the bottom region 3*a* of the tub 3 by flowing inside the gap 55 between the tub 3 and the drum 4.

A small quantity of softener S and/or a small quantity of water W introduced into the tub 3 and flowing inside the gap 55 may enter the drum 4, due to the position of the supply pipe 18.

A relevant quantity of softener S and water W introduced into the tub 3 reach in any case the bottom region 3*a* of the tub 3, filling the sump 15.

Therefore almost all the softener S and/or almost all the water W reaches the bottom region 3*a* of the tub 3 with a minimum absorption from the laundry arranged inside the drum 4.

According to aspects of the invention, during the rinsing cycle (step 230*n*) the mixing circuit 30 is activated (step 241).

Activation of the mixing circuit 30 is advantageously carried out through activation of the first recirculation pump 31.

In a first preferred embodiment of the invention, activation of the mixing circuit 30 preferably starts at the same time of activation of the supply valve 5*a*.

In a further preferred embodiment of the invention, activation of the mixing circuit 30 more preferably starts after a delay time from activation of the supply valve 5*a*, for example after a delay time of 10 sec. In this case, the delay time ensures that the first recirculation pump 31 is working properly, i.e. guarantees that a quantity of liquid (softener S and/or water W) reaches the sump 15 when the first recirculation pump 31 is activated.

In different embodiments, nevertheless, the activation of the mixing circuit 30 may start even before activation of the supply valve 5*a* or, on the contrary, activation of the mixing circuit 30 may start after the supply valve 5*a* has been de-activated (closed). In the latter, the mixing circuit 30 is activated after all the quantity Qs of softener S and all the first quantity Q1*w* of water W have been introduced into the tub 3.

When the mixing circuit 30 is activated (step 241), the liquid (water W and softener S) is drained from the bottom region 3*a* of the tub 3 and re-admitted into to the same bottom region 3*a* of the tub 3. In particular, the liquid (water W and softener S) is drained from sump 15 and re-admitted again into the sump 15. More preferably, the liquid (water W and softener S) is drained from sump 15 and re-admitted again into the sump 15 below the heating device 10.

Activation of the mixing circuit 30 advantageously mixes the softener S and the water W at the bottom region 3*a* of the tub 3, more preferably inside the sump 15.

The mixing action causes the quantity Qs of softener S to be properly and homogeneously diluted in the first quantity Q1*w* of water W.

This is particularly advantageous when the softener S is in a concentrated or a super concentrated form. in the first quantity Q1*w* of water W.

During activation of the mixing circuit 30 (step 241), therefore, a homogeneous liquid mixture of softener S and water W is prepared at the bottom region 3*a* of the tub 3.

After a predetermined mixing time, for example 60 sec, the liquid mixture may be considered ready to be conveyed on the laundry inside the drum 4.

In the preferred embodiment here described, the mixing circuit 30 is advantageously activated without any interruption, i.e. activated continuously for 60-80 sec. In different embodiments, nevertheless, the mixing circuit 30 may be activated intermittently. The mixing time is therefore obtained as the sum of the times in the successive activations.

In the preferred embodiment here described, after the introduction of all the softener S and all the first quantity Q1w of water W inside the tub 3 (step 240) and after the mixing phase (step 241), the liquid mixture at the bottom region 3a of the tub 3 reaches a level Lm. The level Lm is in this case a level at which the liquid mixture partially touches the drum 4, i.e. a level Lm which is above the lower point of the drum 4.

The level Lm depends on the quantity Qs of softener S and on the first quantity Q1w of water W previously introduced into the washing tub 3. The level Lm obviously depends also on the physical form of the tub 3 and/or of the drum 4.

The liquid mixture touching the drum 4 may therefore partially enter the perforated drum 4 through the holes of the drum 4 and absorbed by the laundry.

This liquid mixture absorbed by the laundry is advantageously a homogeneous liquid mixture obtained by the previous activation of the mixing circuit 30 (step 241). The laundry therefore absorbs the liquid mixture and the softener S binds to laundry. This improves the efficiency of the softener S on the laundry with respect to the known technique where the softener S not diluted reaches the load.

In a different preferred embodiment, the quantity Qs of softener S and the first quantity Q1w of water W may be adjusted to advantageously maintain the level L'm of the liquid mixture below the lower point of the drum 4, as illustrated in FIG. 10.

In this case, activation of the mixing circuit 30 (step 241) creates a homogeneous liquid mixture of softener S and water W at the bottom region 3a of the tub 3 and the liquid mixture does not enter, or substantially does not enter, the perforated drum 4 (in particular when the drum 4 is not set rotated).

In the preferred embodiment of the method here described, the liquid mixture obtained in the mixing step (step 241), which lies at the bottom region 3a of the tub 3 up to said particular level Lm, L'm, is then conveyed on the laundry exclusively through the holes of the drum 4.

Preferably, in order to enhance the liquid mixture flowing through the holes of the drum 4, in particular when the level Lm is above the lower point of the drum 4, the same drum 4 is set rotated (step 244).

More preferably, the drum 4 is advantageously set rotated (step 244) for a preset period of time, for example 4 min, during which the softener S optimally binds to tumbled laundry.

During this drum rotation phase (step 244), advantageously, the liquid mixture at level Lm directly enters the perforated drum 4 through the holes of the drum 4 and then absorbed by the laundry. This liquid mixture absorbed by the laundry is advantageously a homogeneous mixture. This improves the efficiency of the softener S on the laundry with respect to the known technique.

Furthermore, during the drum rotation phase (step 244) the drum 4 creates turbulence in the liquid mixture. Turbulence further enhances the liquid mixture flowing through the holes of the same drum 4. In this particular case, i.e. when the drum is set rotated (step 244) and thanks to turbulence, the liquid mixture may flow through the holes of the drum 4 even if its level L'm is below the lower point of the drum 4.

During rotation of the drum 4 (step 244) most of the liquid mixture is conveyed inside the drum 4 through the holes of the drum 4, and there absorbed by the laundry.

The preset period of time may be an estimated period of time which is considered to be sufficient for conveying all, or substantially all, the liquid mixture inside the drum 4.

It is clear that a residual portion of liquid mixture remains in the bottom region 3a of the tub 3, in particular in the sump 15.

At this stage, the mixing circuit 30 may be preferably de-activated (step 241a). In the preferred embodiment here described, nevertheless, the mixing circuit 30 is kept working. De-activation of the mixing circuit 30 (step 241b) is carried out successively during the washing program, as described below.

In a successive step (step 245), a second quantity Q2w of clean water W is preferably introduced into the tub 3. The second quantity Q2w of clean water W may be, for example, about 7 liters.

The introduction of the second quantity Q2w of clean water W takes place preferably through the water inlet circuit 5 with activation of the supply valve 5a. In order to convey all the second quantity Q2w of water W (for example said 7 liters) the supply valve 5a is activated for a predetermined water supplying time, for example 70-120 sec.

The clean water W preferably passes through an empty compartment of the drawer 6.

In different embodiments where a bypass circuit is provided, the second quantity Q2w of water W may be advantageously introduced directly into the tub 3 bypassing the drawer 6.

The quantity Q2w of clean water W introduced inside the tub 3 increases the liquid mixture level inside the washing tub 3 up to a new higher level, for example the level Ln illustrated in FIG. 10.

In the preferred embodiment here described, the mixing circuit 30 is still activated (step 241) and the liquid mixture is further mixed with the second quantity Q2w of water W.

The mixing action causes the liquid mixture to be further diluted with the second quantity Q2w of water W.

In case the mixing circuit 30 was previously de-activated (step 241a), the method preferably provide for the activation of the mixing circuit 30 for mixing the liquid mixture with the second quantity Q2w of water W introduced in the tub 3. After a predetermined mixing time, for example 60 sec, the mixing circuit 30 is then preferably de-activated (step 241b).

In the preferred embodiment here described, the diluted liquid mixture at level Ln is conveyed on the laundry exclusively through the holes of the drum 4.

Preferably, in order to enhance the diluted liquid mixture flowing through the holes of the drum 4, the same drum 4 is set rotated (step 246).

More preferably, the drum 4 is advantageously set rotated (step 246) for a preset period of time, for example 8 min.

During this drum rotation phase (step 246), advantageously, the diluted liquid mixture directly enters the perforated drum 4 through the holes of the drum 4.

Furthermore, during the drum rotation phase (step 246) the drum 4 creates turbulence in the diluted liquid mixture. Turbulence further enhances the diluted liquid mixture flowing through the holes of the same drum 4.

Once the drum rotation phase (step 246) is terminated, the water W is removed from the laundry (step 248). The removal of water W (step 248) preferably comprises a spinning phase during which the drum 4 is rotated at high speed (for example about 800-1500 rpm) to obtain the extraction of the water from the laundry. At the same time, the drain pump 26 is activated to drain the liquid from the tub 3 to the outside through the outlet pipe 28.

In the preferred embodiment here described, the rinsing cycle (step 230n) and the washing program after said removing step (step 248) may be considered terminated.

In different embodiments, nevertheless, the washing program may comprise one or more spinning phases (as indicate with reference sign 150 in FIG. 11) for the extraction of the residual water contained in the wet laundry.

It should be noted that in a further preferred embodiment of the invention, the phase of introducing a second quantity of clean water into the tub may be omitted. In this preferred embodiment, the steps (step 245 and step 246) of introducing the second quantity of clean water inside the tub and conveying it inside the drum through its holes may be advantageously omitted.

It should be noted that this preferred embodiment of the method is advantageously carried out in laundry machine 201 of FIG. 10, as said above. This method, in fact, may be advantageously carried out in a laundry washing machine not provided with a second recirculation circuit. Nevertheless, this method may be also carried out in laundry machine 1 previously described in which the second recirculation circuit 20 is not used during the rinsing cycle.

Figure 13:
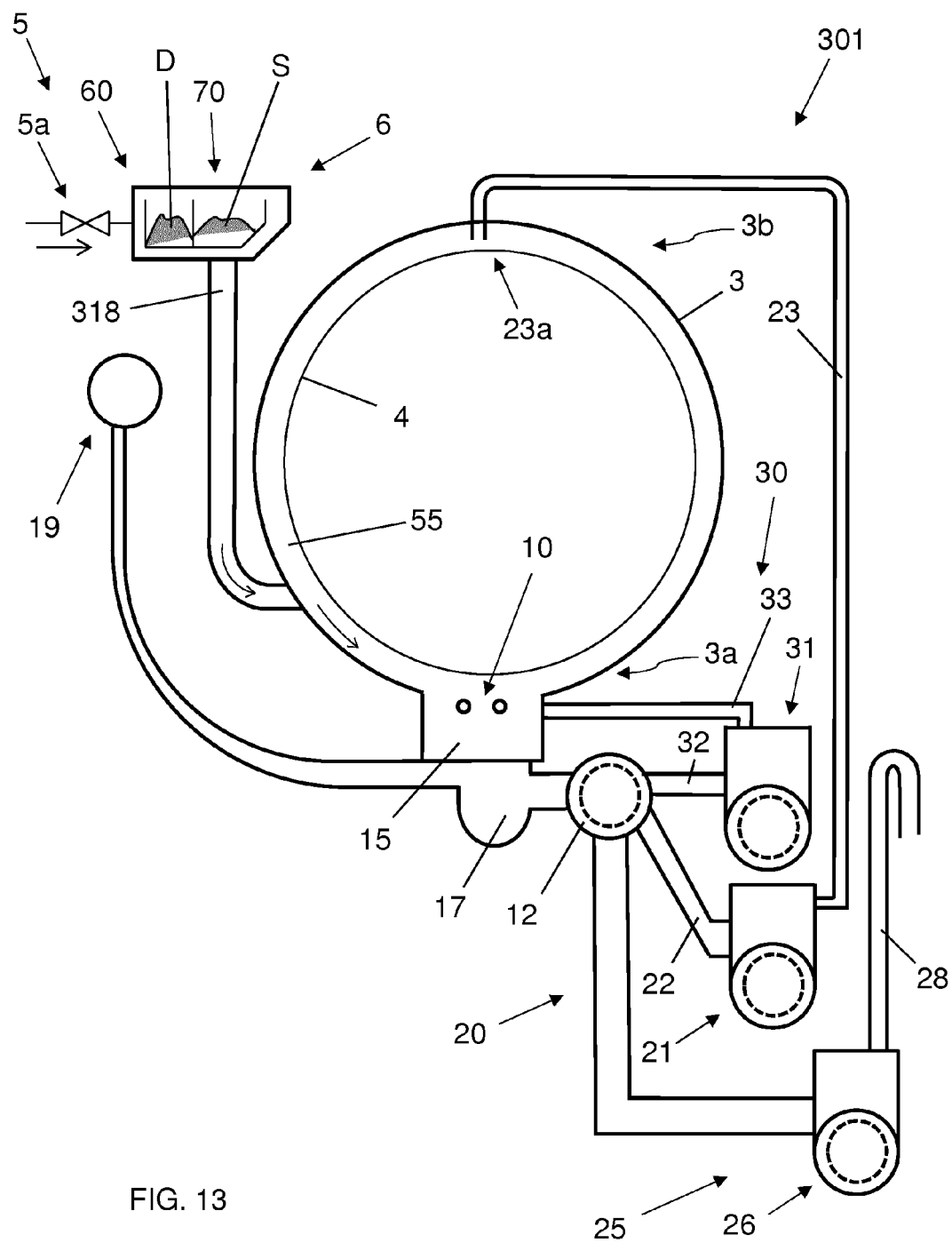
FIGS. 13 and 14 show further schematic views of further preferred embodiments of a laundry washing machine implementing the method according to the present invention.

FIG. 13 shows a schematic view of a further embodiment of a laundry washing machine 301 wherein a method according to aspects of the present invention may be performed.

The laundry washing machine 301 differs from the laundry washing machine 1 described with reference to Figures from 1 to 6 only in that the supply pipe 318 does not terminates at the upper region 3b of the tub 3 but at the bottom region 3a of the tub 3.

The washing method according to aspects of the present invention performed in laundry washing machine 301 may be the same described above with reference to laundry washing machine 1 of Figures from 1 to 6.

In this preferred embodiment, the arrangement of the supply pipe 318 at the bottom region 3a of the tub 3 better guarantees that all, or substantially all, the quantity of liquid coming from the drawer (water W and/or softener S) introduced into the tub 3 falls down on the bottom region 3a of the tub 3 substantially without absorption from the laundry.

In particular, the concentrated softener S introduced into the tub 3 does not enter the perforated drum 4 through its holes and falls down on the bottom region 3a of the tub 3 without absorption from the laundry.

Figure 14:
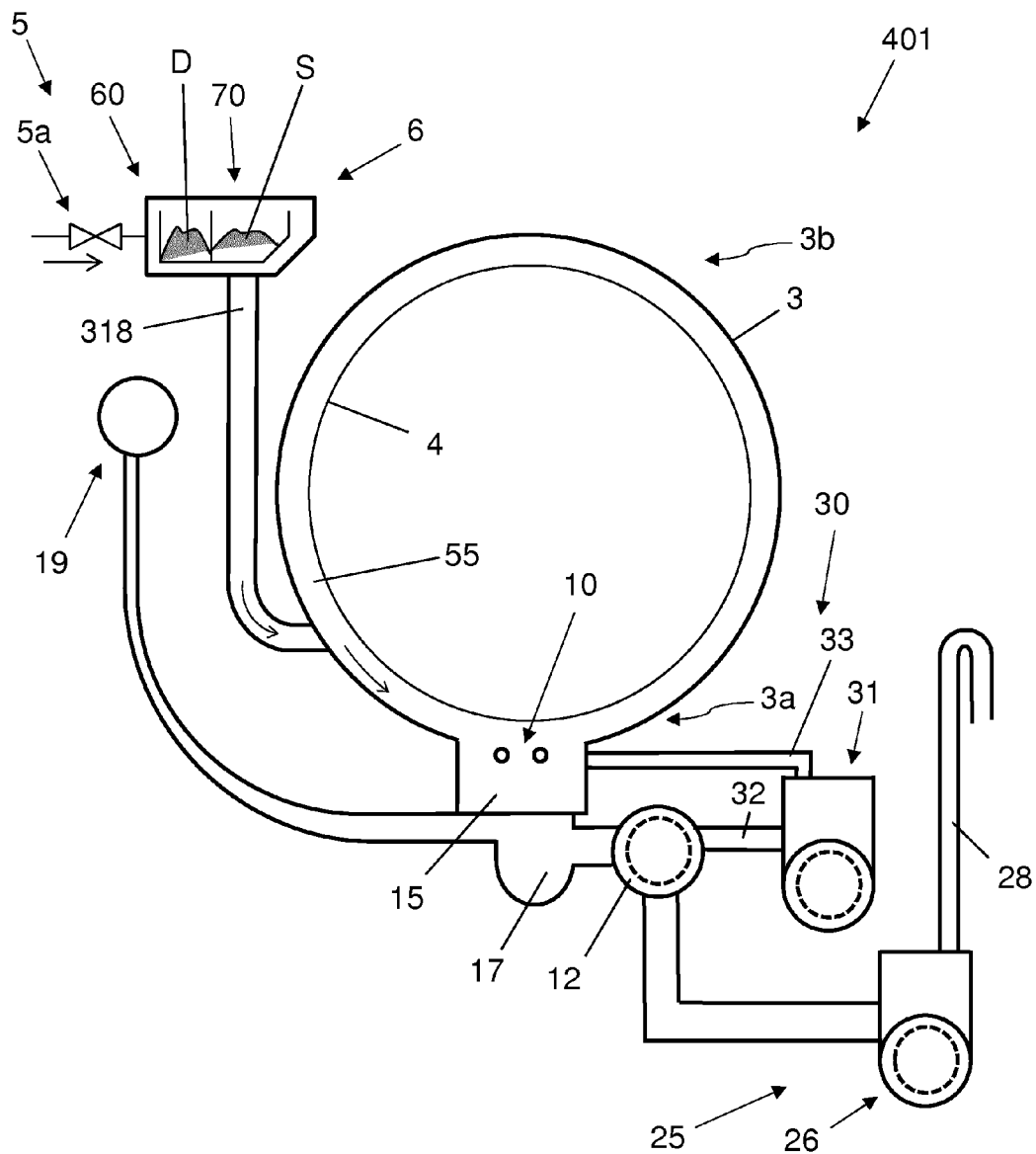

FIG. 14 shows another schematic view of a further embodiment of a laundry washing machine 401 wherein a method according to aspects of the present invention may be performed.

The laundry washing machine 401 differs from the laundry washing machine 201 described with reference to FIG. 10 only in that the supply pipe 318 does not terminates at the upper region 3b of the tub 3 but at the bottom region 3a of the tub 3.

Again, the arrangement of the supply pipe 318 at a bottom region 3a of the tub 3 better guarantees that all, or substantially all, the quantity of liquid coming from the drawer (water W and/or softener S) introduced into the tub 3 falls down on the bottom region 3a of the tub 3 substantially without absorption from the laundry.

In a further embodiment, not illustrated, the method of the invention may be advantageously carried out in a different laundry washing machine wherein the rinse additive supplier comprises a storage tank which automatically dose the rinse additive, in particular the softener, according to the cycle of the washing. In this type of laundry washing machine, also known as auto dosing laundry washing machine, the tank is advantageously filled only once with softener for a plurality of washing programs.

Advantageously, when necessary, the rinse additive from the storage tank is directly conveyed to the tub or conveyed to the drawer by means of a controlled dosing pump.

It has thus been shown that various aspects of the present invention allow all the set objects to be achieved. In particular, it makes it possible to obtain a method for treating laundry with improved softener dissolution with respect to the method of the prior art.

Laundry washing machines illustrated in the figures, and with reference to which some embodiments of the method according to aspects of the invention have been described, are of the front-loading type; however it is clear that the method according to aspects of the invention can be applied as well to a top-loading washing machine, substantially without any modification.

While the present invention has been described with reference to the particular embodiments shown in the figures, it should be noted that the present invention is not limited to the specific embodiments illustrated and described herein; on the contrary, further variants of the embodiments described herein fall within the scope of the present invention, which is defined in the claims.

The invention claimed is:

1. A method for treating laundry in a laundry washing machine of the type comprising:
    a rotatable perforated washing drum provided with holes and configured to receive laundry;
    a washing tub external to said washing drum;
    a water supply circuit comprising at least one supply valve to supply water into said washing tub;
    a detergent supplier to supply detergent into said washing tub;
    a rinse additive supplier to supply at least one rinse additive into said washing tub;
    a first recirculation circuit suitable for withdrawing liquid from a bottom region of said washing tub and for re-admitting such a liquid into said washing tub such that at least a portion of the re-admitted liquid reaches said bottom region of said washing tub without entering said washing drum;

the method comprising at least one washing phase during which said laundry is washed with introduction of water and said detergent into said washing tub and tumbled by rotation of said washing drum, at least one successive draining phase for draining liquid from said washing tub and following said draining phase at least one rinsing cycle during which said laundry is treated by means of said at least one rinse additive;

wherein said rinsing cycle comprises the steps of:
    introducing a quantity of said rinse additive into said washing tub;
    introducing a first quantity of water into said washing tub by activating said supply valve;
    activating said first recirculation circuit for withdrawing liquid from said washing tub and re-admitting said liquid into said washing tub in such a way that a diluted rinse additive is obtained by mixing said quantity of said rinse additive with said first quantity of water at said bottom region of said washing tub;
    introducing said diluted rinse additive into said washing drum in order to be absorbed by said laundry.

2. Method according to claim 1, wherein said step of activating said first recirculation circuit starts at the same time of said activation of said supply valve).

3. Method according to claim 1, wherein said step of activating said first recirculation circuit (30) starts during said step of introducing a first quantity of water into said washing tub and after a delay time from said activation of said supply valve.

4. Method according to claim 3, wherein said step of activating said first recirculation circuit starts after said step of introducing a first quantity of water into said washing tub.

5. Method according to claim 1, wherein said step of activating said first recirculation circuit starts before said step of introducing a first quantity of water into said washing tub.

6. Method according to claim 1, wherein said step of activating said first recirculation circuit lasts for a predetermined period of time suitable for homogeneously mixing said quantity of said rinse additive with said first quantity of water.

7. Method according to claim 1, wherein said step of activating said first recirculation circuit is carried out continuously.

8. Method according to claim 1, wherein said step of activating said first recirculation circuit is carried out intermittently.

9. Method according to claim 1, wherein said step of introducing said diluted rinse additive into said washing drum is carried out by means of a second recirculation circuit suitable for withdrawing liquid from the bottom region of said washing tub and for re-admitting such a liquid into an upper region of said washing tub.

10. Method according to claim 1, wherein said step of introducing said diluted rinse additive into said washing drum is carried out by conveying said diluted rinse additive from said bottom region of said washing tub directly through said holes of said washing drum when said diluted rinse additive is at a level inside said washing tub in which said diluted rinse additive touches said washing drum and/or when said washing drum is set rotated.

11. Method according to claim 10, wherein said level is a level which is above the lower point of said washing drum.

12. Method according to claim 1, wherein said step of introducing said diluted rinse additive into said washing drum is carried out exclusively by conveying said diluted rinse additive from said bottom region of said washing tub directly through said holes of said washing drum when said diluted rinse additive is at a level inside said washing tub in which said diluted rinse additive touches said washing drum and/or when said washing drum is set rotated.

13. Method according to claim 1, wherein during and/or after said step of introducing said diluted rinse additive into said washing drum said washing drum is set rotated.

14. Method according to claim 1, wherein said step of introducing said diluted rinse additive into said washing drum is performed after a step of de-activating said first recirculation circuit.

15. Method according to claim 1, wherein said step of introducing said diluted rinse additive into said washing drum is started before a step of de-activating said first recirculation circuit.

16. Method according to claim 1, wherein said step of introducing a quantity of said rinse additive into said washing tub is carried out such that at least a portion of said rinse additive reaches said bottom region of said washing tub without entering said washing drum.

17. Method according to claim 1, wherein said step of introducing a quantity of said rinse additive into said washing tub is carried out such that substantially all said quantity of said rinse additive reaches said bottom region of said washing tub without entering said washing drum.

18. Method according to claim 1, wherein after said step of introducing said diluted rinse additive into said washing drum the method further comprises a step of introducing a second quantity of water into said washing tub.

19. Method according to claim 18, wherein it comprises a further step of introducing liquid from said bottom region of said washing tub into said washing drum in order to be absorbed by said laundry.

20. Method according to claim 19, wherein said further step of introducing liquid into said washing drum is carried out by means of a second recirculation circuit suitable for withdrawing liquid from the bottom region of said washing tub and for re-admitting such a liquid into an upper region of said washing tub.

21. Method according to claim 19, wherein said further step of introducing liquid into said washing drum is carried out by conveying said liquid from the bottom region of said washing tub directly through said holes of said washing drum when said liquid is at a level inside said washing tub in which said liquid touches said washing drum and/or when said washing drum is set rotated.

22. Method according to claim 19, wherein said further step of introducing liquid into said washing drum is carried out exclusively by conveying said liquid from the bottom region of said washing tub directly through said holes of said washing drum when said liquid is at a level inside said washing tub in which said liquid touches said washing drum and/or when said washing drum is set rotated.

23. Method according to claim 21, wherein said level is a level which is above the lower point of said washing drum.

24. Method according to claim 19, wherein during and/or after said further step of introducing liquid into said washing drum said washing drum is set rotated.

25. Method according to claim 1, wherein said rinsing cycle further comprises a water removal step for removing water from said laundry to the outside.

26. Method according to claim 1, wherein it further comprises one or more final spinning phases for extracting residual water contained in said laundry.

27. Method according to claim 1, wherein said first recirculation circuit is suitable for withdrawing liquid from a sump at the bottom region (3a) of said washing tub and for re-admitting such a liquid into said sump.

28. Method according to claim 1, wherein said at least one rinse additive is a rinse additive of the group comprising: a fabric softener, a fabric conditioner, a waterproofing agent, a fabric enhancer, a rinse sanitization additive, a chlorine-based additive.

* * * * *